(12) United States Patent
Wang

(10) Patent No.: US 10,685,155 B2
(45) Date of Patent: Jun. 16, 2020

(54) METHOD AND SYSTEM FOR DESIGNING A DISTRIBUTED HETEROGENEOUS COMPUTING AND CONTROL SYSTEM

(71) Applicant: Prescient Devices, Inc., Groton, MA (US)

(72) Inventor: Andrew Wang, Groton, MA (US)

(73) Assignee: Prescient Devices, Inc., Groton, MA (US)

( * ) Notice: Subject to any disclaimer, the term of this patent is extended or adjusted under 35 U.S.C. 154(b) by 0 days.

(21) Appl. No.: 16/431,966

(22) Filed: Jun. 5, 2019

(65) Prior Publication Data
US 2019/0377838 A1 Dec. 12, 2019

Related U.S. Application Data

(60) Provisional application No. 62/681,397, filed on Jun. 6, 2018, provisional application No. 62/741,326, filed on Oct. 4, 2018.

(51) Int. Cl.
*G06F 17/50* (2006.01)
*G06F 30/327* (2020.01)
(Continued)

(52) U.S. Cl.
CPC ............. *G06F 30/327* (2020.01); *G06F 8/34* (2013.01); *G06F 2111/04* (2020.01)

(58) Field of Classification Search
CPC ............. G06F 17/5045; G06F 17/505; G06F 17/5068; G06F 17/5081; G06F 17/5072;
(Continued)

(56) References Cited

U.S. PATENT DOCUMENTS 5,640,546 A * 6/1997 Gopinath ................. G06F 9/52
   713/400
5,870,588 A * 2/1999 Rompaey ............ G06F 17/5022
   703/13

(Continued)

OTHER PUBLICATIONS

International Searching Authority—Invitation to Pay Additional Fees—International Application No. PCT/US2019/035502 dated Aug. 21, 2019, together with the Provisional Opinion Accompanying the Partial Search Result, 14 pages.

*Primary Examiner* — Helen Rossoshek
(74) *Attorney, Agent, or Firm* — Sunstein LLP

(57) ABSTRACT

A computer-implemented method designs a distributed heterogeneous computing and control system, including both an application and a hardware context and configuring the application in the hardware context. The method is implemented by design software instructions executing in a computer node, associated with an interactive display, to establish an interactive environment utilizing computer processes. The computer processes provide access in the interactive environment to a set of functional modules and a set of primitive modules. The computer processes receive the interactive environment a selection of desired ones of the functional modules and the primitive modules and order them in a manner to characterize the distributed computing and control system as a schematic of a set of devices. The computer processes parse the schematic to produce a set of sub-schematics that each correspond to a distinct device in a set of devices in the distributed computing and control system. The computer processes transmit the set of sub-schematics to the set of devices and configure each device to execute the sub-schematic via a corresponding control program running inside the device.

36 Claims, 31 Drawing Sheets

(51) Int. Cl.
*G06F 111/04* (2020.01)
*G06F 8/34* (2018.01)

(58) Field of Classification Search
CPC ............. G06F 2217/74; G06F 2217/06; G06F 2217/04; G06F 16/3329; G06F 16/904; G06F 17/50; G06F 8/38; G06F 16/583; G06F 16/90344; G06F 8/34; G06F 16/93; G06F 17/27; G06F 8/20; G06F 8/30; G06F 8/34
See application file for complete search history.

(56) References Cited

U.S. PATENT DOCUMENTS

| | | | | |
|---|---|---|---|---|
| 5,878,408 A * | 3/1999 | Van Huben | ............ | G06F 17/50 |
| 6,339,836 B1 * | 1/2002 | Eisenhofer | .......... | G06F 17/5022 |
| | | | | 716/106 |
| 6,618,856 B2 * | 9/2003 | Coburn | ............ | G05B 19/41885 |
| | | | | 700/86 |
| 6,961,690 B1 * | 11/2005 | Karchmer | ........... | G06F 17/5022 |
| | | | | 703/15 |
| 7,143,341 B1 * | 11/2006 | Kohli | ...................... | G06F 17/50 |
| | | | | 715/234 |
| 7,168,059 B2 * | 1/2007 | Bowyer | .............. | G06F 17/5022 |
| | | | | 703/13 |
| 7,392,255 B1 * | 6/2008 | Sholtis | .................. | G06F 16/256 |
| 7,546,232 B2 * | 6/2009 | Brooks | ................ | G05B 19/409 |
| | | | | 702/183 |
| 7,546,571 B2 * | 6/2009 | Mankin | ............... | G06F 17/5045 |
| | | | | 700/103 |
| 7,805,698 B1 * | 9/2010 | Ferguson | ............ | G06F 17/5072 |
| | | | | 716/103 |
| 8,117,537 B1 * | 2/2012 | Vell | ..................... | G06F 17/2205 |
| | | | | 715/236 |
| 8,244,512 B1 * | 8/2012 | Tseng | .................. | G06F 17/5022 |
| | | | | 703/13 |
| 8,548,992 B2 * | 10/2013 | Abramoff | ............. | G06F 16/904 |
| | | | | 707/726 |
| 8,577,664 B2 * | 11/2013 | Batarseh | ............... | G06F 3/0483 |
| | | | | 703/14 |
| 8,832,612 B1 * | 9/2014 | O'Riordan | .......... | G06F 17/5063 |
| | | | | 716/101 |
| 9,031,824 B2 * | 5/2015 | Nasle | .................... | G06Q 10/04 |
| | | | | 703/13 |
| 9,182,948 B1 * | 11/2015 | O'Riordan | .......... | G05B 19/0426 |
| 9,201,994 B1 * | 12/2015 | Tripathi | ............... | G06F 17/5045 |
| 9,335,977 B2 * | 5/2016 | Wang | ......................... | G06F 8/34 |
| 9,521,209 B2 * | 12/2016 | Lovisa | ..................... | G06F 9/54 |
| 9,705,736 B2 * | 7/2017 | Wang | ...................... | H04L 41/08 |
| 9,846,694 B1 * | 12/2017 | Cook | ..................... | G06F 16/93 |
| 10,068,054 B2 * | 9/2018 | Van Rooyen | .......... | G06N 3/002 |
| 10,313,361 B2 * | 6/2019 | Ros-Giralt | .......... | H04L 63/1408 |
| 2003/0095141 A1 * | 5/2003 | Shah | .................... | G06F 9/44505 |
| | | | | 715/735 |
| 2005/0076327 A1 * | 4/2005 | Helal | ........................ | G06F 8/20 |
| | | | | 717/100 |
| 2005/0278670 A1 * | 12/2005 | Brooks | ................ | G05B 19/409 |
| | | | | 703/6 |
| 2006/0214947 A1 * | 9/2006 | Boose | ...................... | G06F 11/206 |
| | | | | 345/619 |
| 2007/0214171 A1 * | 9/2007 | Behnen | ..................... | G06F 8/10 |
| 2007/0294074 A1 | 12/2007 | Ciolfi | | |
| 2014/0122986 A1 * | 5/2014 | Spada | ................. | G06F 17/2264 |
| | | | | 715/212 |
| 2015/0268936 A1 * | 9/2015 | Huber | ....................... | G06F 8/34 |
| | | | | 717/108 |
| 2016/0048936 A1 * | 2/2016 | Perkowski | ........... | G06Q 10/063 |
| | | | | 705/310 |
| 2017/0083651 A1 * | 3/2017 | Akkaraju | ............... | G06F 17/504 |
| 2017/0109933 A1 * | 4/2017 | Voorhees | ............. | G06T 11/206 |
| 2018/0011958 A1 * | 1/2018 | Irissou | ................ | G06F 17/5036 |
| 2018/0011959 A1 * | 1/2018 | Irissou | ................ | G06F 17/5036 |
| 2018/0139110 A1 * | 5/2018 | Johnson | .................... | G06F 9/50 |

* cited by examiner

```
{
    name": "Module 1",
    "lib": "Lib 2",
    "schematic": {"type": "functional", "version": "2.1"},
    "schematic2": {"type:": "behavioral" , "version": "1.0"},
}
```

METHOD AND SYSTEM FOR DESIGNING A DISTRIBUTED HETEROGENEOUS COMPUTING AND CONTROL SYSTEM

PRIORITY

This patent application claims the benefit of U.S. provisional patent application 62/681,397, filed Jun. 6, 2018, and U.S. provisional patent application 62/741,326, filed Oct. 4, 2018. Each of these applications is hereby incorporated, in its entirety, by reference.

TECHNICAL FIELD

The present invention relates to methods of designing applications for a distributed heterogeneous computing system.

BACKGROUND ART

The concept of computing and control systems, which have both hardware and software components, is known in the art. A computing and control system is used to provide coordinated control of equipment, devices, and computer processes. It also provides data processing capabilities on data collected by such equipment, devices, and computer processes inside the system. A computing and control system is considered to be distributed if multiple devices exist in the system and some coordination occurs between these devices. The devices are generally located separately and communicate with each other through a communication network. A computing and control system is heterogeneous if multiple devices exist in the system and at least one of the devices has a different hardware configuration, software configuration, operating system, programming method, development tool, and such, from at least one of the other devices.

An example distributed heterogeneous computing and control system is an Internet of Things (IoT) system, in which there are generally at least one server computer and a plurality of edge devices. The at least one server computer generally has powerful hardware resources, while each of the edge devices generally have constrained hardware resources. The edge devices can also differ from each other in hardware resources, software configuration, operating system, programming method, etc.

Designing applications for such a distributed heterogeneous computing and control system is difficult due to the distributed and heterogeneous nature of the system. Traditional programming methods are ordinarily not well suited for distributed heterogeneous systems because they produce application programs intended to run on a single device. That is, traditional programming methods do not support producing application programs that run on multiple devices that have different hardware configurations, software configurations, operating systems, etc.

For example, a development team may need to implement an application for the following distributed heterogeneous system. A first edge device of the system has a temperature sensor, which is attached to the body of an industrial machine, and the first edge device reads the temperature from the sensor periodically. If the temperature goes above a threshold, the first edge device sends an alert message to a server computer. A second edge device communicates with the industrial machine through a serial port and can read from or write to the industrial machine's internal registers. The second edge device reads the industrial machine's internal status registers periodically. If a status becomes abnormal, the second edge device sends an alert message to the server computer. A third edge device is attached to a video camera, which can take a photo or video of the area surrounding the industrial machine. If the server computer receives an alert message from either the first edge device or the second edge device, the server computer requests the third edge device to take a photo. The server computer sends both the alert message and the photo to a client device. An operator checks the alert message and the photo on the client device, and if the operator determines that the situation is an emergency, the operator sends a command to the second edge device to shut down the industrial machine.

To implement the above example in a traditional application, at least five separate application programs need to be implemented: one program for the first edge device; one program for the second edge device, one program for the third edge device, and two programs for the server computer. The first program for the server computer may process data coming from the first, second, and third edge devices, and the second program for the server computer may be a web application for the client device. Implementing this example application on the different devices using traditional programming methods is a complex and incoherent process.

For example, when application programs executing on different devices of a distributed heterogeneous system communicate with each other, the application programs need to be very careful with data format compatibility. In the above example, the temperature in the program of the first edge device may be expressed as a floating-point number, and typically needs to be converted to characters (char) to be sent through a communication interface. The application program executing on the server computer that receives the temperature then must convert the characters back into a floating-point number. This conversion process is very error-prone when multiple distributed application programs are involved. Further, the different devices may use different network interfaces, such as ethernet, WiFi, cellular, Zigbee, etc. Therefore, each device may need to install one or more network device drivers and use one or more communication data formats. The application programs that execute on the different devices may also need to implement different application programs and convert transmitted data between different communication data formats depending on the network interfaces.

The application programs executed on different devices may also be implemented in different programming languages. In the above example, the first edge device may execute an application program implemented in Python, the second edge device may execute an application program implemented in Lua, the third edge device may execute an application program implemented in C++, and the server computer may execute an application program implemented in Javascript. The different programming languages optimize different performance parameters, which makes implementation using these different programming languages very complex. Further, the different application programs executed on the different devices are updated remotely. For example, the application programs are generally developed in one or more computers accessible by a development team, and the developed programs are then pushed, either in original format or in compiled format, to respective devices. The more application programs that exist among the different devices, the more complex the update process.

Due to these challenges, implementing application programs for distributed heterogeneous systems is a complex, tedious, and error-prone process. Generally multiple development tools, multiple development processes, and multiple developers with different skill sets are required to implement these application program, which makes implementing distributed heterogeneous systems an expensive and time-consuming process.

SUMMARY OF THE EMBODIMENTS

In accordance with one embodiment of the invention, a computer-implemented method designs a distributed heterogeneous computing and control system, including both an application and a hardware context and configuring the application in the hardware context. The method is implemented by design software instructions executing in a computer node, associated with an interactive display, to establish an interactive environment utilizing computer processes. The computer processes include providing, by the computer node, access in the interactive environment to a set of functional modules and a set of primitive modules, wherein any of the modules can be graphically selected by a user. The computer processes further include receiving, by the computer node, in the interactive environment a selection of desired ones of the functional modules and the primitive modules and ordering them in a manner to characterize the distributed computing and control system as a schematic of a set of devices. The computer processes also include parsing, by the computer node, the schematic to produce a set of sub-schematics, each sub-schematic corresponding to a distinct device in a set of devices in the distributed computing and control system. The computer processes further include transmitting, by the computer node, the set of sub-schematics to the set of devices so as to characterize each of the devices in accordance with the schematic. The computer processes also include configuring, by the computer node, each device to execute the sub-schematic via a corresponding control program running inside the device.

Optionally, the computer node is a stand-alone computer. Alternatively or additionally, the computer node is implemented by a client-server combination in a network environment. Alternatively or additionally, the computer processes include characterizing, by the computer node, the schematic by a netlist, and storing, by the computer node, the schematic as the netlist. Alternatively or additionally, the computer processes further include rendering, by the computer node, a view of the schematic in the interactive environment by retrieving and processing a stored netlist. Alternatively or additionally, the interactive environment includes graphical components of a design canvas, a library manager, and a menu, wherein any of the graphical components can be graphically selected by the user. Alternatively or additionally, the computer processes further include displaying, by the computer node, in the design canvas a member selected from the group consisting of the schematic, a corresponding netlist, and combinations thereof.

Alternatively or additionally, the computer processes further include assigning, by the computer node, a unique device identifier (ID) to each device in the set of devices. Alternatively or additionally, the computer processes further include assigning, by the computer node, a device name to at least one device in the set of devices, wherein the device name can be graphically inscribed by the user.

Alternatively or additionally, receiving the selection of the desired ones of the functional modules and the primitive modules causes creation of module instances corresponding to the desired ones, and ordering the module instances in a manner to characterize the distributed computing and control system as the schematic. Alternatively or additionally, ordering the module instances includes, with respect to a pair of the module instances that are in communication with one another, configuring a virtual wire between the pair to indicate such communication. Alternatively or additionally, the computer processes further include following receiving, by the computer node, an input of dragging and dropping a graphical representation of a given module to a view of the schematic displayed in a design canvas of the interactive environment, causing a module instance of the given module to be created and ordered in the schematic.

Alternatively or additionally, the computer processes further include characterizing, by the computer node, a module instance of a given module using graphically selectable components selected from the group consisting of (i) at least one property in a property table, (ii) a graphical representation, (iii) at least one schematic, (iv) at least one device-dependent block, and (iv) combinations thereof. Alternatively or additionally, the property table contains properties for characterizing the at least one schematic that include type and version. Alternatively or additionally, when the given module is a primitive module, the property table contains properties for each device-dependent block associated with the given module, wherein the properties for each device-dependent block include a device type list and version. Alternatively or additionally, the property table contains user-selectable properties for the module instance selected from the group consisting of (i) an instance name, (ii) an instance type for instantiating the given module, (iii) a particular device in which to execute the module instance, (iv) at least one instance parameter, and (v) combinations thereof. Alternatively or additionally, at least one property of the particular device is inherited by each child module instance created from the module instance.

Alternatively or additionally, the computer processes further include associating, by the computer node, a device-dependent block with a module instance of a given primitive module, in which the computer processes include the following. The computer processes include locating, in a property table for the module instance, a device property corresponding to the module instance, wherein the device property specifies a device identifier (ID) for one of the set of devices. The computer processes also include mapping the device ID to a device type, and locating, in the property table for the given module, a device-dependent block associated with the device type. The computer processes further include automatically updating, in the property table for the module instance, a type property corresponding to the module instance with a name assigned to the device-dependent block. Optionally, automatically updating the type property is overridden by user-selection of the type property.

Alternatively or additionally, the computer processes further include displaying, by the computer node, in the interactive environment: a tree graph that includes a hierarchical structure of module instances characterizing the schematic and graphical representations of correctly-chosen device-dependent blocks positioned below the tree graph and linked to corresponding primitive module instances in the tree graph. Alternatively or additionally, transmitting the set of sub-schematics to the set of devices includes, for each sub-schematic that has a primitive module instance, transmitting a device-dependent block to a distinct device corresponding to the sub-schematic. Alternatively or additionally, the schematic has components, including module instances, and the computer processes further include assigning, by the computer node, to a given component of the schematic, a distinct address based on a combination of (i) a device ID of a device, (ii) a path that defines a name of each component to be traversed in order within the schematic to reach the given component, and (iii) a name of the given component. Alternatively or additionally, the schematic has components, including module instances, and the computer processes further include assigning, by the computer node, to a given module instance, a distinct address based on a combination of (i) a device ID of a device, and (ii) an ID of the given module instance, and assigning, by the computer node, to a given component which is not a module instance, a unique address that is defined by the combination of: (i) a device ID of a device, (ii) an ID of a module instance that includes the given component, and (iii) a name of the given component.

Alternatively or additionally, parsing the schematic includes as following. For each device in the set of devices, the computer processes further include creating a sub-schematic for the device. For each module instance of the schematic, the computer processes further include copying the module instance into a sub-schematic in which the device of the sub-schematic corresponds to a device ID of the module instance. The computer processes further include processing a virtual wire that connects a first module instance and a second module instance in the schematic, which includes as follows. When the first module instance and the second module instance are both in a given sub-schematic, the computer processes further include preserving the virtual wire in the given sub-schematic. When the virtual wire connects (i) an output pin of the first module instance in a first sub-schematic to (ii) an input pin of the second module instance in a second sub-schematic, the computer processes further include creating a comm connection between the first sub-schematic and the second sub-schematic.

Alternatively or additionally, creating the comm connection includes as follows. The computer processes further include adding a first comm module instance to the first sub-schematic, and adding a virtual wire between the output pin of the first module instance and an input pin of the first comm module instance. The computer processes further include adding a second comm module instance to the second sub-schematic, and adding a virtual wire between an output pin of the second comm module instance and the input pin of the second module instance. The computer processes further include setting a destination address included in the first comm module instance to an address of the input pin of the second module instance. The computer processes further include setting a receive address included in the second comm module to an address of the input pin of the second module instance. Alternatively or additionally, the computer processes further include assigning, by the computer node, to each of the destination address and receive address, a distinct address based on a combination of (i) a device ID of a device, (ii) a path that defines a name of each component to be traversed in order within the schematic to reach a targeted pin, and (iii) a name of the targeted pin. Alternatively or additionally, the computer processes further include assigning, by the computer node, to each of the destination address and receive address, a distinct address based on a combination of (i) a device ID of a device, (ii) an ID of a module instance that includes a targeted pin, and (iii) a name of the targeted pin. Alternatively or additionally, the comm module is associated with a plurality of functional schematics, wherein each functional schematic implements a distinct communication protocol, and wherein the interactive environment is configured for both (i) user-selection that individually changes a comm module instance type for a given comm module instance, and (ii) user-selection that globally changes the comm module instance type for each comm module instance.

Alternatively or additionally, the computer processes further include establishing, by the computer node, a central comm broker that utilizes a publish-subscribe communication protocol for communications between a first comm module instance and a second comm module instance. The publish-subscribe communication protocol is configured to receive a request to subscribe the second comm module instance with the central comm broker, wherein the request includes specifying a receive address for the second comm module instance, and the receive address is an address of an input pin of a module instance connected to the second comm module. The publish-subscribe communication protocol is further configured to transmit a data packet from the first comm module instance to the central comm broker, wherein the data packet contains data selected from the group consisting of a data payload, a destination address, a source address, and combinations thereof, and wherein the source address is an address of an output pin of a module instance connected to the first comm module instance, and the destination address is an address of the input pin of the intended destination module instance. When the destination address in the data packet matches the receive address of the second comm module instance, the publish-subscribe communication protocol is also configured to cause the comm broker to forward the data packet to the second comm module instance.

Alternatively or additionally, the sub-schematic is configured such that a comm module instance, which includes a transmit path and a receive path, is shared among a plurality of module instances of the sub-schematic, and the computer processes further include transmitting, by the computer node, to the comm module instance in a device of the set of devices, a given data packet with a destination address that includes identification of the device. The comm module instance is configured to receive, through the receive path, any data packet that has a destination address that includes identification of the device, including the given data packet. The comm module instance is further configured to analyze the destination address in the given data packet, and forward the given data packet to a module instance of the sub-schematic with a receive address corresponding to the destination address.

Alternatively or additionally, the computer processes further include causing, by the computer node, a device of the set of devices to execute a new schematic loaded on the device, wherein the device is pre-loaded with a control program and an init schematic having a comm module instance connected to a sys module instance, wherein a receive address of the comm module instance is set to receive any data packet in which the destination address includes identification of the device and the sys module, as follows. The computer processes transmitting, by the computer node, to the device a data packet that has a data payload containing a new sub-schematic and a destination address that includes identification of the device and the sys module, wherein the destination address causes the sys module instance to (i) receive the data packet, (ii) load on the device the new sub-schematic, and (iii) request the control program to execute the new sub-schematic.

Alternatively or additionally, the computer processes further include causing, by the computer node, a device to execute schematics, and wherein the device is configured to pre-load a control program and an init schematic. When the device is powered on, the device is further configured to cause execution of the init schematic by the control program. The device is also configured to receive and load, using the init schematic, a new sub-schematic. The device is further configured to receive a reload command that causes execution of the new sub-schematic by the control program. Alternatively or additionally, for each primitive module instance in a sub-schematic, executing in the device, a device-dependent block associated with the primitive module instance, wherein the device-dependent block is loaded by the control program using the type module instance property of the associated primitive module instance.

Alternatively or additionally, the computer processes further include executing, by the computer node, a compiler that converts a sub-schematic into binary code, and transmitting, by the computer node, to a low-capability device corresponding to the schematic, the binary code for execution on the device. Alternatively or additionally, the computer processes further include the following. The computer processes further include receiving, by the computer node, in the interactive environment selection of a visualization module instance to further characterize the distributed computing and control system as the schematic. The computer processes further include setting, by the computer node, a device property of the visualization module instance in the schematic to a value indicating a simulation context. The computer processes further include parsing, by the computer node, the schematic to produce the set of sub-schematics includes producing a sub-schematic for a virtual device. The computer processes further include executing, by the computer node, the sub-schematic in the simulation context on the virtual device. Alternatively or additionally, the device property of the visualization module instance is set to an ID of at least one device, and the computer processes further comprise causing the visualization module to be transmitted to the at least one device for execution.

Alternatively or additionally, the computer process further include as follows. The computer processes further include receiving, by the computer node, in the interactive environment selection of simulate menu option. For each module instance in the schematic, the computer processes further include setting, by the computer node, a device property of the module instance to a value indicating execution of the module instance in a simulation context. For each module instance in the schematic, the computer processes further include, when a default behavioral schematic is associated with the module instance, setting a type property of the module instance to a component name indicating a default behavioral schematic. The computer processes further include parsing the schematic to produces only one sub-schematic for a virtual device. The computer processes further include executing, by the computer node, each module instance of the sub-schematic in the simulation context through the virtual device. Alternatively or additionally, the type property of a module instance is user-selectable to a different value than the component name of the default behavioral schematic.

BRIEF DESCRIPTION OF THE DRAWINGS

The foregoing features of embodiments will be more readily understood by reference to the following detailed description, taken with reference to the accompanying drawings, in which.

DETAILED DESCRIPTION OF SPECIFIC EMBODIMENTS

Figure 1:
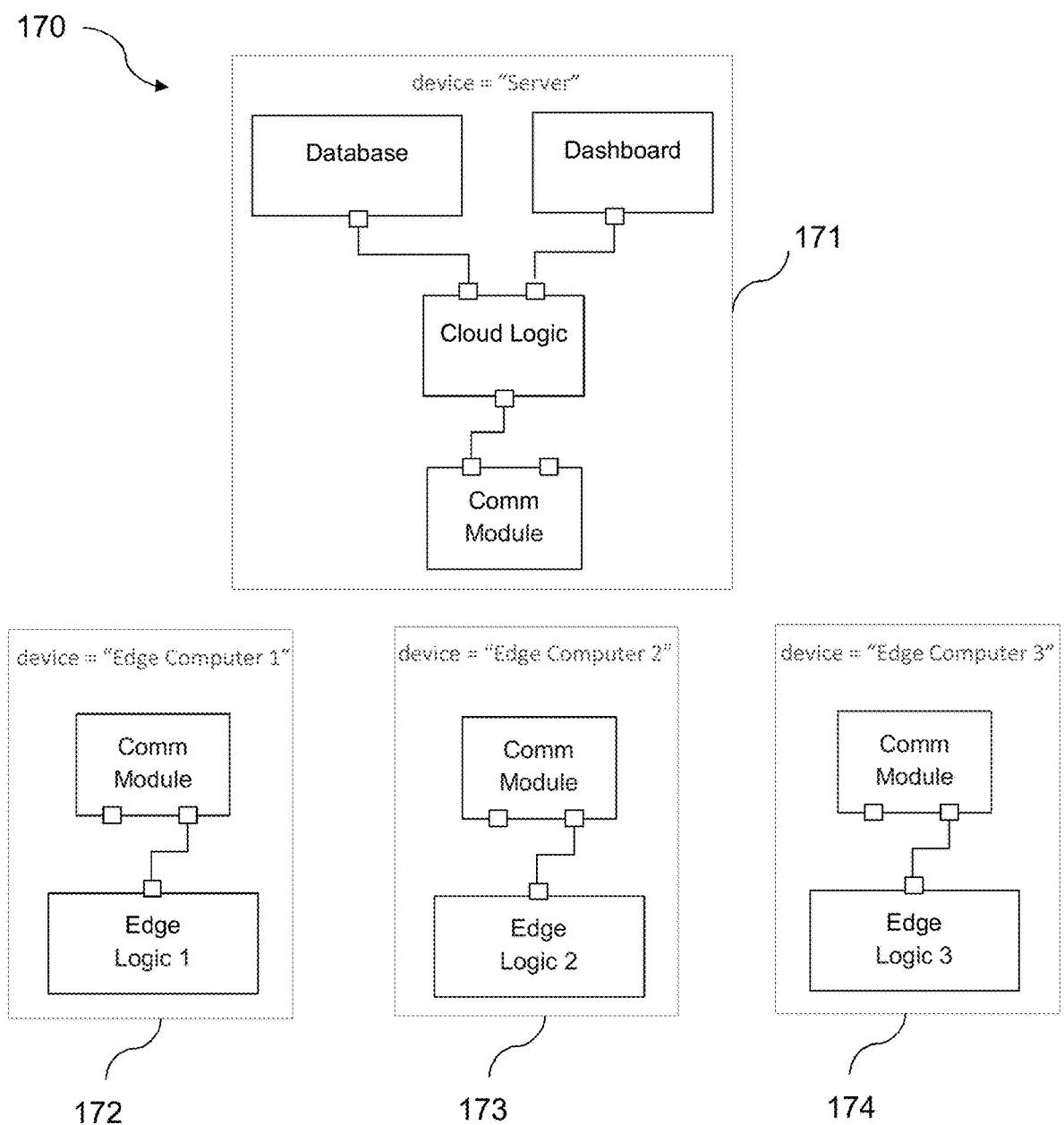
FIG. 1 is a block diagram of a distributed heterogeneous computing and control system for which applications are designed in accordance with an embodiment of the present invention.

Definitions. As used in this description and the accompanying claims, the following terms shall have the meanings indicated, unless the context otherwise requires:

A "set" includes at least one member.

A system is "distributed" if it includes a plurality of nodes, in physically distinct locations, in communication with one another over network.

A system is "heterogeneous" if one or more devices in the system require different application programming code due to differences in hardware configuration or software configuration.

An "application" is a task or a set of tasks a device or system needs to accomplish.

A block of "application code" is a block of software program code written for a software application to run in one or more devices.

A "device" is an instance of an item of hardware, and includes, not only the configuration of the hardware, but also any software environment associated with the hardware.

A "real device" is a device that is physically distinct.

A "virtual device" is a device that is operationally distinct.

A "communication network", or "network", is a medium used to connect distributed devices together. It can be the internet, or special network protocols such as industrial ethernet, or a combination of multiple network protocols. It can be wired, wireless, or a combination of wired and wireless.

A "server" is a computer used to run software programs. It can be local or in the cloud.

A "database" is an organized collection of data stored and accessed electronically.

A "client device" is a device used by a person to interact with a software program. It can be a computer or a mobile device such as a smart phone.

An "edge computer", or "edge device", is a computer or micro-controller device having multiple I/O connection terminals and is used to connect to various sensors, switches, audio/video devices, equipment, or measurement devices and can communicate unidirectionally or bidirectionally with these devices.

A "developer" is a person who designs applications for a system.

A "design software" is a software program that enables a user to design and manage applications for a system. In the present invention, "design software" refers to the software program embodiment to design applications for a distributed heterogeneous computing and control system.

A "user" is a person who uses design software to design or manage applications for a system.

A "schematic" is a virtualized graphical representation of a particular function and is independent of hardware context and software configurations. Virtualizations can be hierarchical.

A "functional schematic" is a schematic configured to perform a particular application function and is independent of hardware context and software configurations.

A "behavioral schematic" is a schematic configured to model a "functional schematic", such as a simplified model or a statistical model.

A "system schematic" is the schematic implemented in the design software that represents the application of the entire distributed heterogeneous computing and control system. A system schematic is hierarchical and includes all elements in all hierarchies.

A "sub-schematic" is a schematic parsed from the system schematic to represent the application of a particular real or virtual device in the distributed heterogeneous computing and control system. Additional modules and other elements can be added into the sub-schematic to complete or enhance functionality.

A "netlist" is a text representation of a schematic. A netlist and its corresponding schematic are functionally equivalent.

A "module", or "design module", is a structure that contains one or more of the following components: property table, symbol, functional schematics, behavioral schematics, and "device-dependent" blocks.

A "module symbol" is a block shape representation of a module. It is used in schematics.

A "module instance" is the instantiation of a module in a schematic. It appears as a module symbol in the schematic, and it instantiates into either a schematic component or a device-dependent block component of the corresponding module. A schematic can contain multiple module instances from the same module.

A "device-dependent" block is a block of application code written for a device, wherein the structure and content of the code depend on the configuration of a member selected from the group consisting of the hardware environment of the device, the software environment for the code, and combinations thereof, and are typically different for different types of devices.

A "functional module instance", or "functional module", is a module instance that instantiates into a functional schematic.

A "behavioral module instance", or "behavioral module", is a module instance that instantiates into a behavioral schematic.

A "primitive module instance", or "primitive module", or "primitive", is a module instance that instantiates into a device-dependent block.

A "pin" of a module represents the input, or output, or bidirectional port of a module. It is where an external signal can be connected. A module can have multiple pins, which are typically drawn as small squares or other shapes in both schematics and symbols.

A "virtual wire" represents a connection between two modules. It indicates that data flows from an output pin of a first module into an input pin of a second module. A virtual wire can also be multi-segmented connecting multiple modules.

An "element" of a schematic refers to any individual entity inside a schematic. This can include property, pin, instance symbol, virtual wire, parameter, and etc.

An "address" of an element in a schematic is a unique identifier for that element.

A "device type" is an identifier for a type of physical or virtual device. Each "device-dependent" block is tied to one or more device types to indicate compatibility.

A "device ID", or "device_id", is a unique identifier for a device in a system.

A "module ID", or "module_id", is a unique identifier for a module instance inside a schematic. The "module ID" of a module instance does not need to be the same as the "address" of the module instance.

"Parsing" is the process to extract sub-schematics from the system schematic. Additional modules and other elements can be added to the sub-schematics in the process.

A "communication module", or "comm module", is a module for which the primary function is to send data from its input pin to a remote destination via a network or receive data from a remote destination via a network and deliver that data to its output pin. Note that a comm module can also be implemented as a transmit module and a receive module separately.

A "communication broker", or "comm broker", is a software program that manages bidirectional communication between multiple devices over a network. Every device subscribes to one or more message topics with the comm broker. Each device can send data payload plus a message topic to the comm broker, and comm broker will forward the data payload to the devices that subscribe to the said message topic.

An "init schematic" is a schematic that is pre-loaded into a device and executed by a control program. Its functions include but are not limited to sub-schematic update and system command execution.

A "sys module" is a module for which its functions include but are not limited to sub-schematic update and system command execution.

A "control program" is a software program running in a device that is capable of loading and executing sub-schematics and an init schematic. Different implementations of control programs can exist for different devices or even the same device.

A "compiler" is a software program that converts program code into machine code or lower-level code to be executed on an intended device.

A "chart" is a module that generates a plot of the data on its input pin. The data can be plotted alongside the schematic window or in a different window. The plot can be chosen to be a time-series plot, a histogram, a pie chart, etc.

A "probe" is a module that prints the data arriving at its input pin. The data can be printed inside the schematic window, in another window, or to a file.

A "computer process" is the performance of a described function in a computer using computer hardware (such as a processor, field-programmable gate array or other electronic combinatorial logic, or similar device), which may be operating under control of software or firmware or a combination of any of these or operating outside control of any of the foregoing. All or part of the described function may be performed by active or passive electronic components, such as transistors or resistors. In using the term "computer process" we do not necessarily require a schedulable entity, or operation of a computer program or a part thereof, although, in some embodiments, a computer process may be implemented by such a schedulable entity, or operation of a computer program or a part thereof. Furthermore, unless the context otherwise requires, a "process" may be implemented using more than one processor or more than one (single- or multi-processor) computer.

Embodiments of the present invention provide a system and method for designing applications to execute in a distributed heterogeneous system. In these embodiments, a user does not need to be concerned with either the distributed or the heterogeneous nature of the system. Instead, the user can implement a system schematic that defines the application to be executed in the distributed heterogeneous system, and the system schematic is parsed into sub-schematics for execution in corresponding devices of the distributed heterogeneous system. This enables the user to implement the application for the system with a focus on data processing and data flow between the devices, which is what matters in implementing such application, instead of on complex issues, such as communication, data conversion, remote update, etc.

FIG. 1 is a block diagram of a distributed heterogeneous computing and control system 10 for which applications are designed in accordance with an embodiment of the present invention. The system 10 includes a centralized server 16 communicatively coupled through a communication network 14 to a client device 17, edge computers 11, 12, 13, and a database 15. Each of the devices 11, 12, 13, 15, 16, 17 may be a physical device or a virtual device, and some or all of the devices 11, 12, 13, 15, 16, 17 may be heterogeneous (with varying device types, device applications, etc.). The communication network 14 may be configured with one or more types of network devices and one or more network protocols. In an example embodiment, system 10 is a special case distributed computing and control system configured with devices that are all the same device type.

In some embodiments, as a distributed system, the system 10 executes an application that is implemented across the centralized server 16, client device 17, edge computers 11, 12, 13, and database 15, and requires coordination among these devices. For example, the system 10 may execute an application for monitoring an industrial machine that requires coordination between devices 11, 12, 13, 15, 16, 17. To execute this application, application code is implemented in each edge computers 11, 12, 13 to take readings from a different sensor of the industrial machine, and send an alert to the centralized server 16 when a reading is above a threshold value for that sensor. The application code implemented in the edge computers 11, 12, 13 may access the threshold values for the sensors from the database 15. Application code is also implemented in the centralized server 16 to receive and coordinate the alerts from each edge computer 11, 12, 13, and determine an error condition of the industrial machine. The application code of the centralized server 16 further sends to the client device 17 the error condition, and application code implemented on the client device 17 receives and presents the error condition to an operator of the industrial machine.

As a heterogeneous system, each of the edge computers 11, 12, 13 may have a different hardware configuration, software configuration, operating system, programming method, development tool, and such. For example, edge computer 1 11 may be a low-capability microcontroller (MCU), and edge computer 2 12 may be a single-board-computer running the Linux operating system. For another example, edge computer 2 and edge computer 3 13 may have the same hardware configuration, but edge computer 2 12 may implement applications in the C programming language, while edge computer 3 13 may implement applications in the Python programming language. Customarily, the differences in hardware configuration, software configuration, etc. among the devices 11, 12, 13, 15, 16, 17 of the system 10 require different programming languages, software development tools, etc. be used in designing an application to be implemented across the devices 11, 12, 13, 15, 16, 17, which results in different code structures in the application for performing the same application function on different devices. As known by one of ordinary skill in the art, customarily, a heterogeneous system cannot be designed in a single programming language or software development tool.

In embodiments of the present invention, a user designs an application to be implemented across the devices 11, 12, 13, 15, 16, 17 of the system 10 by defining a system schematic of the application functions, which is parsed into sub-schematics for each of the devices 11, 12, 13, 15, 16, 17. In some embodiments, each sub-schematic is loaded and executed in the corresponding device 11, 12, 13, 15, 16, 17 by a control program implemented for that corresponding device. In other embodiments, each sub-schematic is compiled into binary code that is loaded and executed in the corresponding device.

Figure 2:
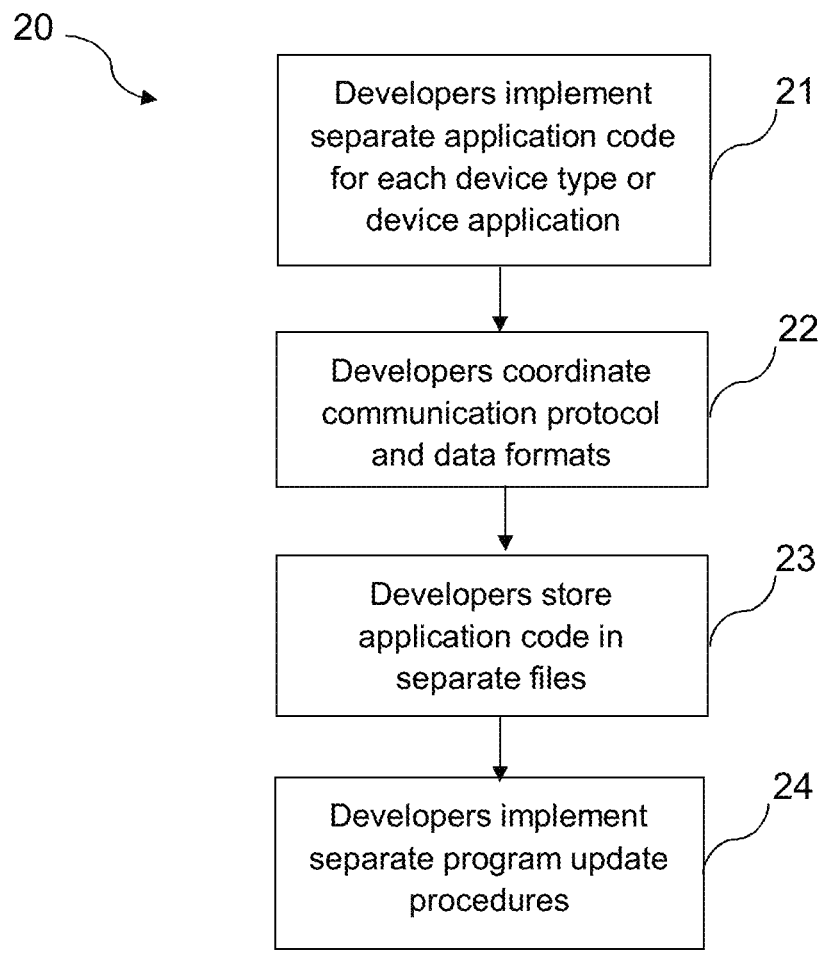
FIG. 2 is a flowchart illustrating a method of designing an application for a distributed heterogeneous computing and control system in the prior art.

FIG. 2 is a flowchart illustrating a method 20 of designing an application for a distributed heterogeneous computing and control system in the prior art. In a first process 21 of method 20, developers design the application by implementing multiple separate application code programs that each correspond to a particular device type, particular device application, etc. in the system. The implementation of the application code programs typically requires different programming languages, development tools, and development frameworks, which make the design complex and challenging. Because of the existence of multiple application code programs, in a second process 22, the developers must implement each application code program to coordinate the communication protocols and data communication formats used by the different devices in the system, which is an error prone process. In a third process 23, the developers store the application code programs in separate files or repositories. In a fourth process 24, the developers implement separate program update procedures to distribute each application code program to one or more devices in the system having device types, device applications, etc. corresponding to the application code program.

Figure 3:
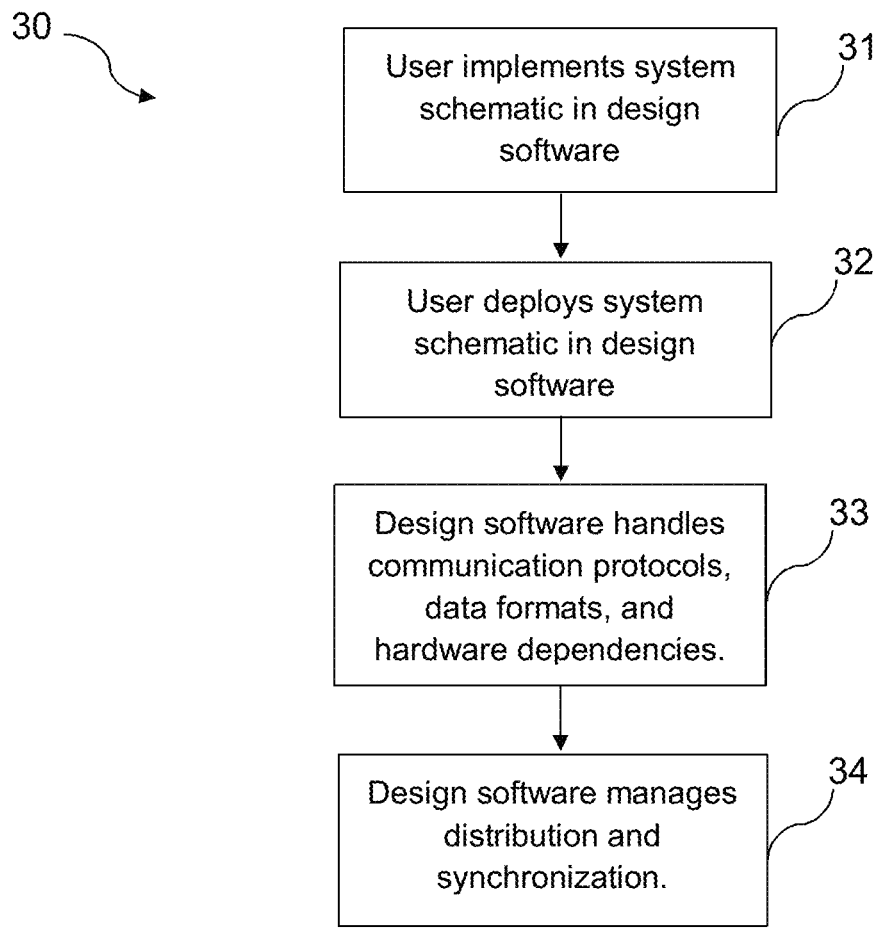
FIG. 3 is a flowchart illustrating a method of designing an application for a distributed heterogeneous computing and control system in accordance with an embodiment of the present invention.

FIG. 3 is a flowchart illustrating a method 30 of designing an application for a distributed heterogeneous computing and control system in accordance with an embodiment of the present invention. In a first process 31 of method 30, a user designs the application by implementing a system schematic, which is a schematic representation of an application for execution across the distributed heterogeneous computing and control system, in design software. The user may implement the system schematic through a user interface configured to be in communication with the design software. The use of the system schematic eliminates implementing separate application code programs via multiple programming languages, development tools, and development frameworks to design an application.

In a second process 32, the user deploys the system schematic in the design software across the distributed heterogeneous computing and control system. The system schematic is deployed as a set of sub-schematics, such that each sub-schematic corresponds to one or more devices of the set of devices and is transmitted to those devices. In a third process 33, the design software handles the communication protocols, data communication formats, and hardware dependencies through the deployed sub-schematics. In a fourth process 34, the design software manages the distribution and synchronization of the sub-schematics in devices across the distributed heterogeneous computing and control system.

Figure 4:
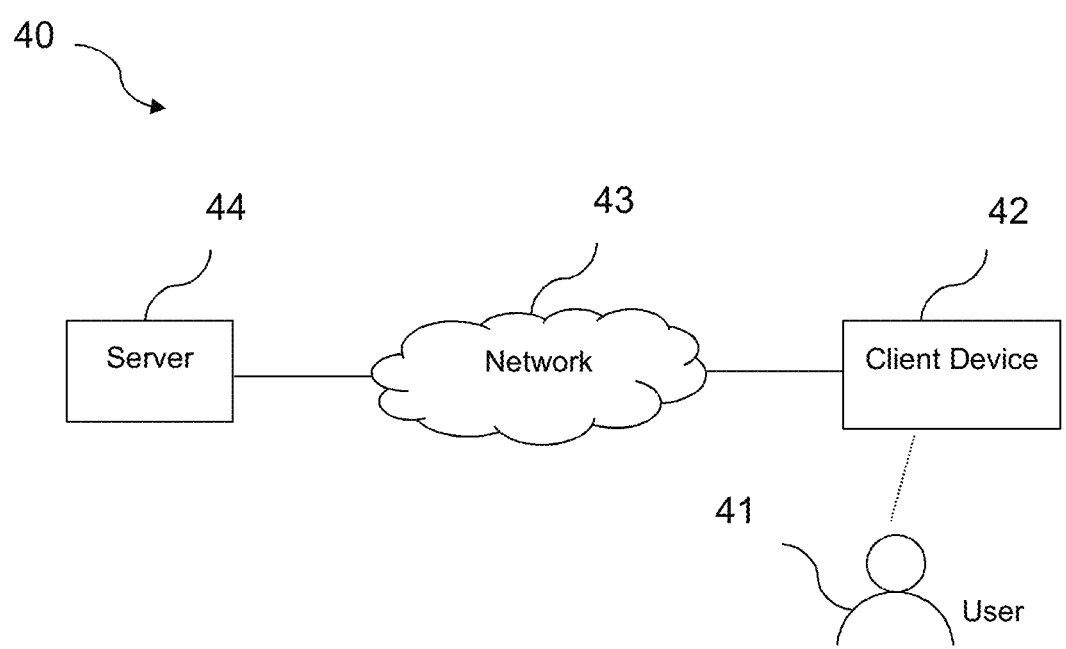
FIG. 4 is a block diagram of a system used to execute design software in accordance with an embodiment of the present invention.

FIG. 4 is a block diagram of a system 40 used to execute design software in accordance with an embodiment of the present invention. The system 40 is also referred to as a computer node. The system 40 of FIG. 4 is a client-server combination in a network environment, which includes a server 44 communicatively coupled to a client device 42 through a network 43. The client device 42 is operated by a user 41. The design software is associated with a graphical user interface, which the server 44 displays to the user 41 on the client device 42. The client device 42 may be a computer that executes a web browser or a local software program, a mobile device that executes an app, and such. In other embodiments, the system may be a stand-alone computer.

The server 44 executes the design software to implement, apportion, deploy, and execute system schematics of an application for a distributed heterogeneous computing and control system. The user may provide input to the design software through the graphical user interface on the client device 42. The server 44 may store the design software in full or in part. In embodiments where the client device 42 is a web browser, the server 44 stores the full design software and provides portions of the design software to the client device 42 through network 43. In embodiments where the client device 42 is a local software program or an app, the server 44 stores part of the design software, and the client device 42 stores the remainder of the design software. In other embodiments, the full design software is stored on the client device without being connected to a server.

Figure 5:
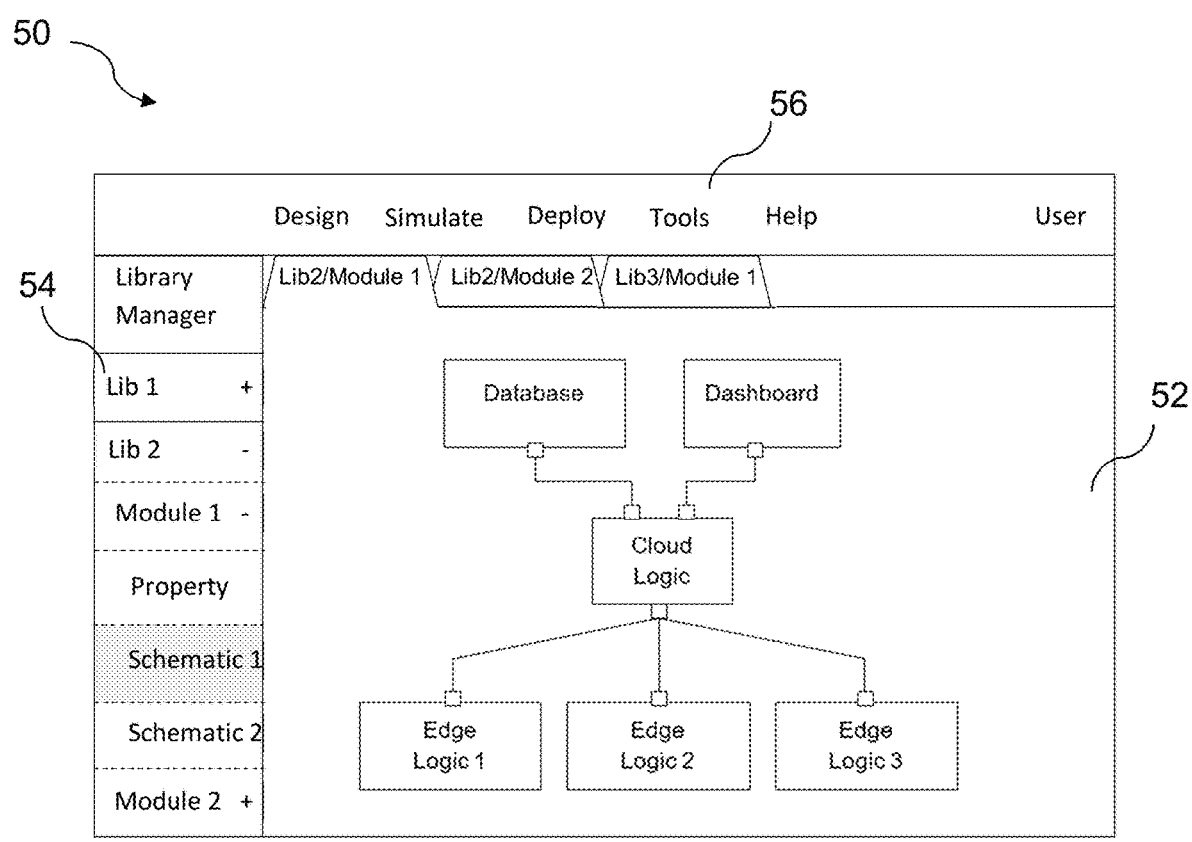
FIG. 5 is a graphical user interface used to design applications for a distributed heterogeneous computing and control system in accordance with an embodiment of the present invention.

FIG. 5 is a graphical user interface 50 used to design applications for a distributed heterogeneous computing and control system in accordance with an embodiment of the present invention. In embodiments of the present invention, a user designs an application for a distributed heterogeneous system by designing a schematic to represent the application functions. The graphical user interface 50 provides an interactive environment to the user for designing and deploying the schematic. The graphical user interface 50 includes, but is not limited to, the following components: a design canvas 52, a library manager sub-panel 54, and a menu bar 56. In the design canvas 52, the user forms schematics for the distributed heterogeneous system. A formed system schematic may be saved in a library as a new module for use in designing a future schematic. In the design canvas 52, multiple schematic tabs can be simultaneously open for designing multiple schematics.

The library manager sub-panel 54 displays design modules (e.g., functional modules, primitive modules, behavioral modules, etc.) grouped in libraries. Each library is a set of modules grouped under one library name. The user can select a module from the library manager to be opened or placed in the design canvas. For example, a user can drag modules from the library manager sub-panel 54 and drop the modules into the design canvas 52. Such selection of modules may create instances of the modules. The user may order and structure the created module instances within the design canvas 52 to design a schematic for the distributed heterogeneous system. The menu bar 56 is composed of multiple menu options and pull-down menus, which provide the user options for designing, simulating, and deploying the schematic.

Figure 6:
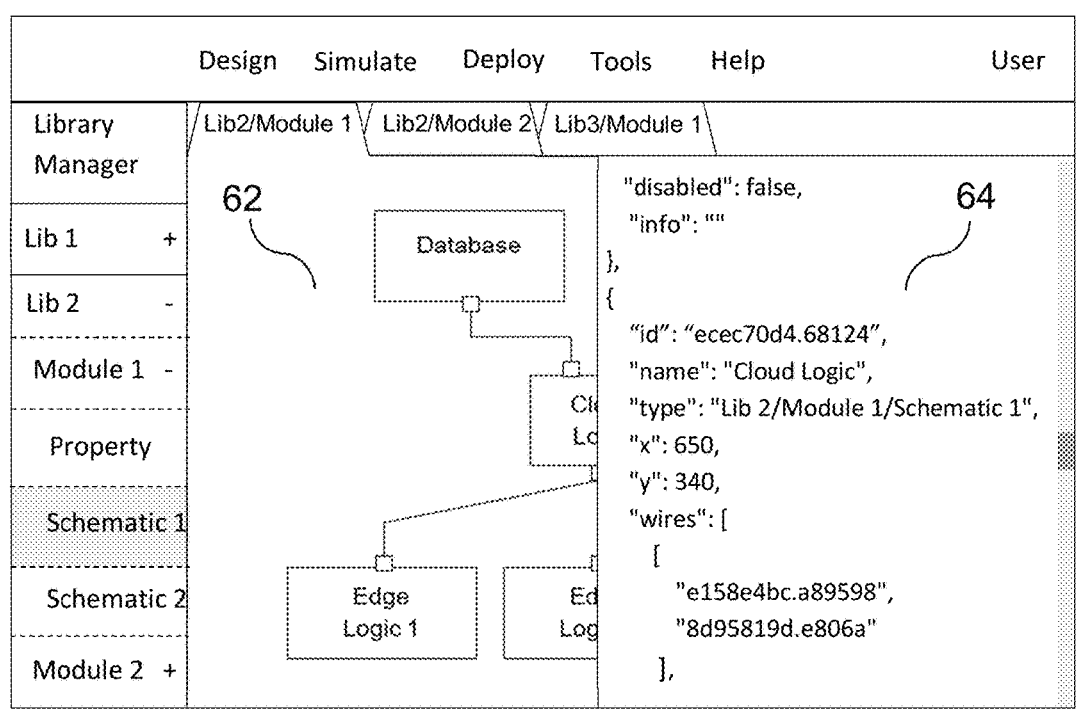
FIG. 6 illustrates the display of a schematic and corresponding netlist in the graphical user interface of FIG. 5 in accordance with an embodiment of the present invention.

FIG. 6 illustrates the display of a schematic 62 and corresponding netlist 64 in the graphical user interface 60 in accordance with an embodiment of the present invention. The graphically represented application functions and devices in the schematic 62 may comprise an application executed across the distributed heterogeneous system. The schematic 62 is functionally equivalent to the corresponding text-based netlist 64. In FIG. 6, a portion of the netlist 64 is displayed for the "Cloud Logic" module instance in schema 62, which shows parameters for this module instance, including identifier, name, type, coordinates in the design canvas, and identifiers of virtual wires connecting this module instance to other module instances. In an embodiment, the schematic is stored in memory as the netlist 64, and design software renders the stored netlist 64 into the form of the schematic 62 displayed in the graphical user interface 60. A user, through the graphical user interface 60, may visualize and edit one or both of the schematic 62 or the netlist 64. When one of the schematic 62 or netlist 64 is edited, the design software automatically updates the other in accordance with the edit.

Design software that is associated with a graphical user interface is known in the art. However, existing design software does not support the design of distributed heterogeneous systems. Most existing design software runs and executes designs in the same computer. The design software in accordance with the present invention parses a design (e.g., as a schematic) into components (e.g., sub-schematics), transmits the components to a set of distributed heterogeneous devices, and executes the components in these distributed heterogeneous devices.

Figure 7:
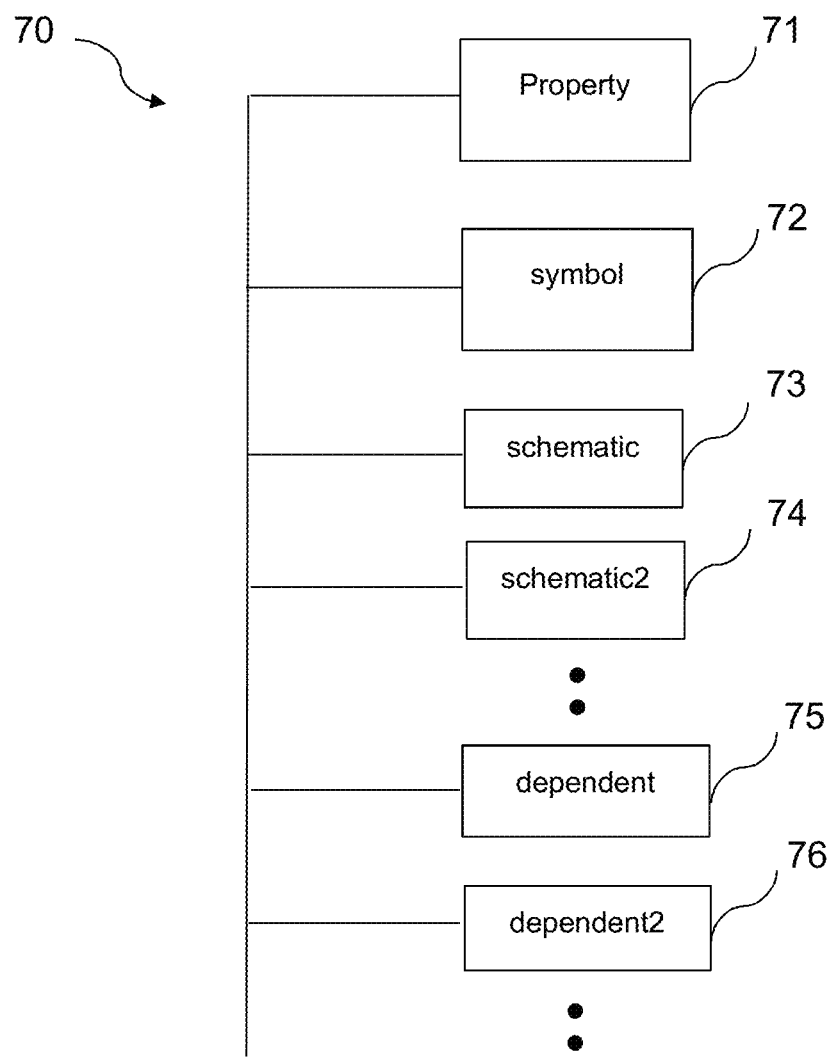
FIG. 7 is a block diagram of module components in accordance with an embodiment of the present invention.

FIG. 7 is a block diagram of module components 70 in accordance with an embodiment of the present invention. A module is a unit that includes one or more application functions of a distributed heterogeneous system. The module may be instantiated into module instances that are placed and ordered in a system schematic. As shown in FIG. 7, the components of a module include a property table 71, a graphical representation (also referred to as a module symbol) 72, schematics 73, 74, and device-dependent blocks 75, 76 (in the case of a primitive module or primitive module instance). The schematics may be functional schematics, behavioral schematics, etc. A module may include other types of components without limitation.

Figure 8:
FIG. 8 is a block diagram of a property table defining module properties in accordance with an embodiment of the present invention.

FIG. 8 is a block diagram of a property table 80 defining module properties in accordance with an embodiment of the present invention. The property table 80 includes the module properties of module name, module library, and component properties. The property table 80 is for the module "Module 1". In the property table 80, the module property name is set to "Module 1", and the library is set to "Lib 2" to indicate that "Module 1" is stored in the library named "Lib 2". The component properties of the property table 80 include the two schematics that are contained in "Module 1". The first schematic is named "schematic", has a type property set to "functional", which indicates the first schematic is a functional schematic, and has a version property set to "2.1". The second schematic is named "schematic 2", has a type property set to "behavioral", which indicates the second schematic is a behavioral schematic, and has a version property set to "1.0".

Figure 9:
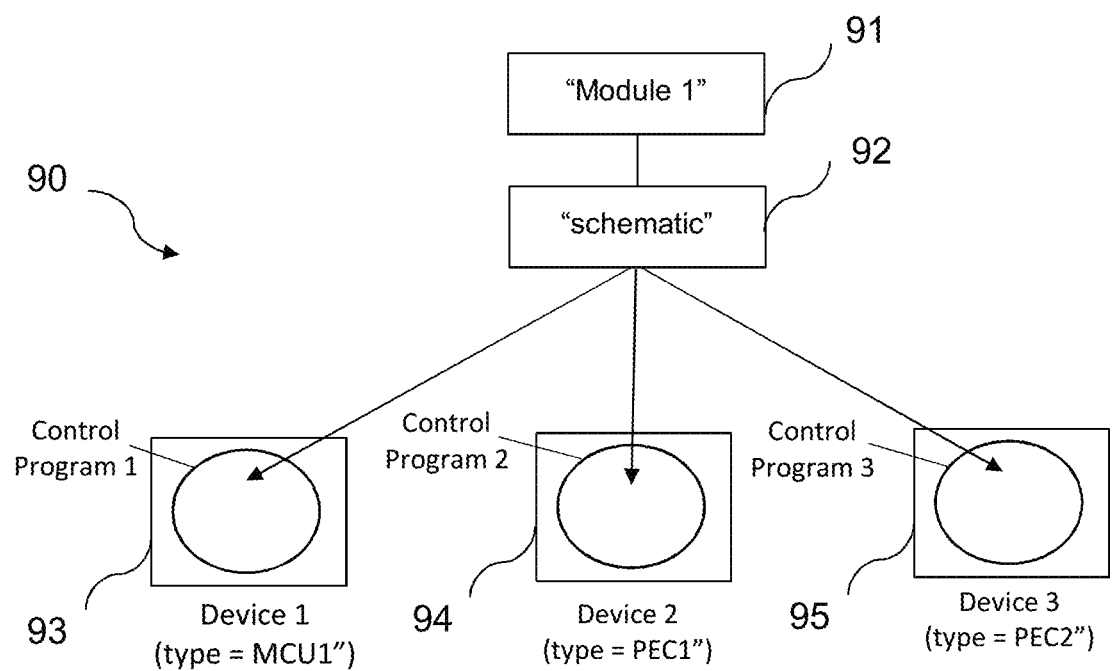
FIG. 9 is a block diagram illustrating execution of a schematic in different types of devices in accordance with an embodiment of the present invention.

FIG. 9 is a block diagram illustrating execution 90 of a schematic in different types of devices in accordance with an embodiment of the present invention. A schematic (e.g., functional schematic and behavioral schematic) in embodiments of the present invention is device-independent, which means that the same schematic can be executed in different types of devices. FIG. 9 shows the module instance named "Module 1" which contains the schematic 92. FIG. 9 also shows a distributed heterogeneous system that includes three heterogeneous devices 93, 94, 95 that are each a different type of device. Specifically, device 1 93 is type "MCU1", device 2 94 is type "PEC1", and device 3 is type "PEC2". As the schematic 92 is device-independent, it can be loaded and executed on each of the heterogeneous devices 93, 94, 95, even though the devices are each a different type of device.

A control program is implemented to run on each device that executes the chematic. Specifically, control program 1 is implemented on device 1 93, control program 2 is implemented on device 2 94, and control program 3 is implemented on device 3 95. For compatibility with the different-typed devices 93, 94, 95, each control program can be implemented in different programming languages, use different development tools, be implements in different hardware architectures, etc. Although the control programs have different implements based on their device types, each are able to execute the same schematic 92 (rather than requiring different schematics for each device 93, 94, 95).

Figure 10:
FIG. 10 is a block diagram of another property table defining module properties in accordance with an embodiment of the present invention.

FIG. 10 is a block diagram of a property table 100 defining module properties in accordance with an embodiment of the present invention. The property table 100 includes the module properties of module name, module library, and component properties. The property table 80 is for the module "Module 2", which is a primitive module. In the property table 100, the module property of name is set to "Module 2", and the module property of library is set to "Lib 2" to indicate that "Module 2" is stored in the library named "Lib 2". The component properties of the property table 80 include the two device-dependent blocks that are contained in "Module 2". The first device-dependent block is named "dependent", has a device type property set to "PEC1" and "PEC2", and has a version property set to "3.4". This device type property setting indicates that the device-dependent block "dependent" is compatible with two types of device, "PEC1" and "PEC2". The second device-dependent block is named "dependent 2", has a device type property set to "MCU1", and has a version property set to "2.7". This device type property setting indicates that dependent block "dependent 2" is compatible with one type of device, "MCU1".

As shown in FIG. 10, a module, such as "Module 2", can contain multiple device-dependent blocks that are compatible with one or more types of devices. In some embodiments, the different device-dependent blocks in a module perform the same application function but in the context of different devices. In other embodiments, some or all of the device-dependent blocks in a module perform different application functions in the context of different devices.

Figure 11:
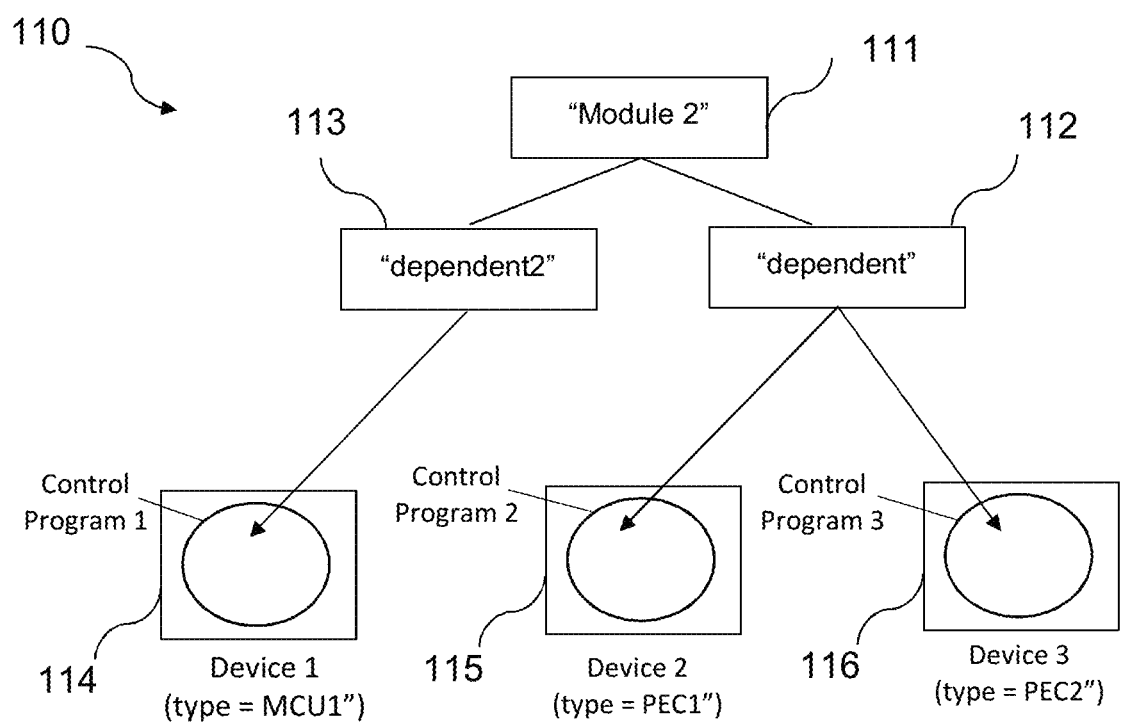
FIG. 11 is a block diagram illustrating execution of device-dependent blocks in compatible devices in accordance with an embodiment of the present invention.

FIG. 11 is a block diagram illustrating execution of device-dependent blocks 112, 113 in compatible devices 114, 115, 116 in accordance with an embodiment of the present invention. A device-dependent block, in accordance with its name, is device-dependent, which means that the device-dependent block only executes in a type of device compatible with the device-dependent block. As shown in FIG. 10, a device-dependent block has a device type property that is set to the device types compatible with the device-dependent block. FIG. 11 shows the module 111 named "Module 2" which contains the device-dependent blocks "dependent" 112 and "dependent 2" 113. As shown in FIG. 10, device-dependent block "dependent" 112 is compatible with device types of "PEC1" and "PEC2", and device-dependent block "dependent 2" 113 is compatible with device type "MCU1".

FIG. 11 also shows a distributed heterogeneous system that includes three heterogeneous devices 114, 115, 116 that are each a different type of device. Specifically, device 1 114 is type "MCU1", device 2 115 is type "PEC1", and device 3 116 is type "PEC2". As device-dependent block "dependent" is only compatible with the device types of "PEC1" and "PEC2", it can only be loaded and executed on device 2 115 and device 3 116. Further, as device-dependent block "dependent 2" is only compatible with the device type of "MCU1", it can only be loaded and executed on device 1 114. As such, to use module instance "Module 2" 111 in these devices 114, 115, 116, the device-dependent block "dependent" is selected for loading on device 2 115 and device 3 116, and the block "dependent 2" is selected for loading on device 1 114. Note that device-dependent block "dependent" would not execute correctly in device 1 114, and device-dependent block "dependent 2" would not execute correctly in device 2 115 and device 3 116.

A control program is implemented to run on each device that executes the compatible device-dependent blocks. Specifically, control program 1 is implemented on device 1 114, control program 2 is implemented on device 2 115, and control program 3 is implemented on device 3 116. For compatibility with the different-typed devices 114, 115, 116, each control program can be implemented in different programming languages, use different development tools, be implements in different hardware architectures, etc.

Figure 12:
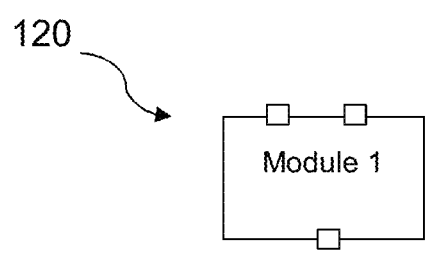
FIG. 12 is a block diagram of a graphical representation of a module in accordance with an embodiment of the present invention.

FIG. 12 is a block diagram of a graphical representation of a module in accordance with an embodiment of the present invention. This same graphical representation may be used for a module and instances of the module. The graphical representation (also referred to as a module symbol), is a rectangle block with square-shaped input and output pins positioned at the edges. In other embodiments, the graphical representation and the pins can be presented as other shapes.

Figure 13:
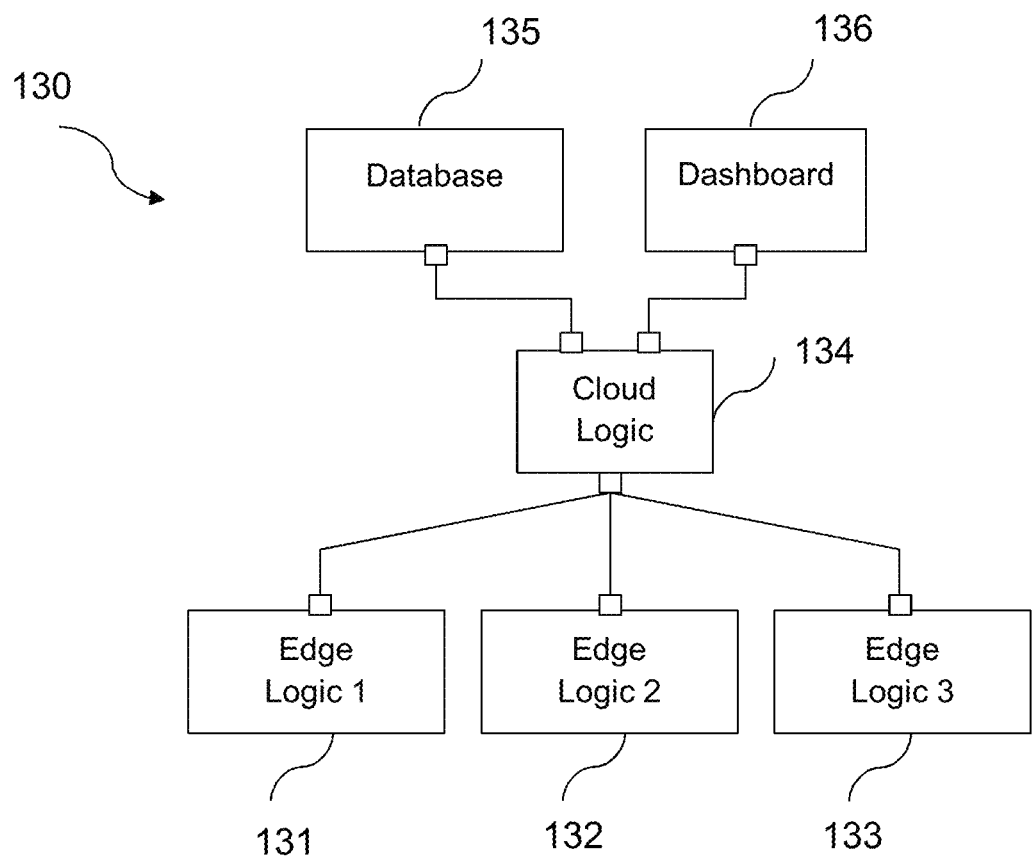
FIG. 13 is a block diagram of a schematic in accordance with an embodiment of the present invention.

FIG. 13 is a block diagram of a schematic 130 in accordance with an embodiment of the present invention. This schematic 130 is a system schematic representing the distributed heterogeneous computing and control system 10. The schematic 130 includes multiple module symbols, each graphically representing an instance of a module. A module symbol of a given module may be used multiple times in a schematic, such that each use is an instantiation, or instance, of the given module. Module instances are connected to each other by virtual wires, representing data flow and communication between the module instances. For example the schematic 130 is a system schematic that includes a database module instance 135, a dashboard module instance 136, a cloud logic module instance 134, an edge logic 1 module instance 131, an edge logic 2 module instance 132, and an edge logic 3 module instance 133, which are each presented as a module symbol. The module instances 131, 132, 133, 134, 135, 136 are hierarchically structured to define the application functions to be executed in the distributed heterogeneous computing and control system. The schematic 130 includes virtual wires between pairs of module instances, such as between the cloud logic module instance 134 and the edge logic 1 module instance 131, to represent data flow or communication between the pair.

Figure 14:
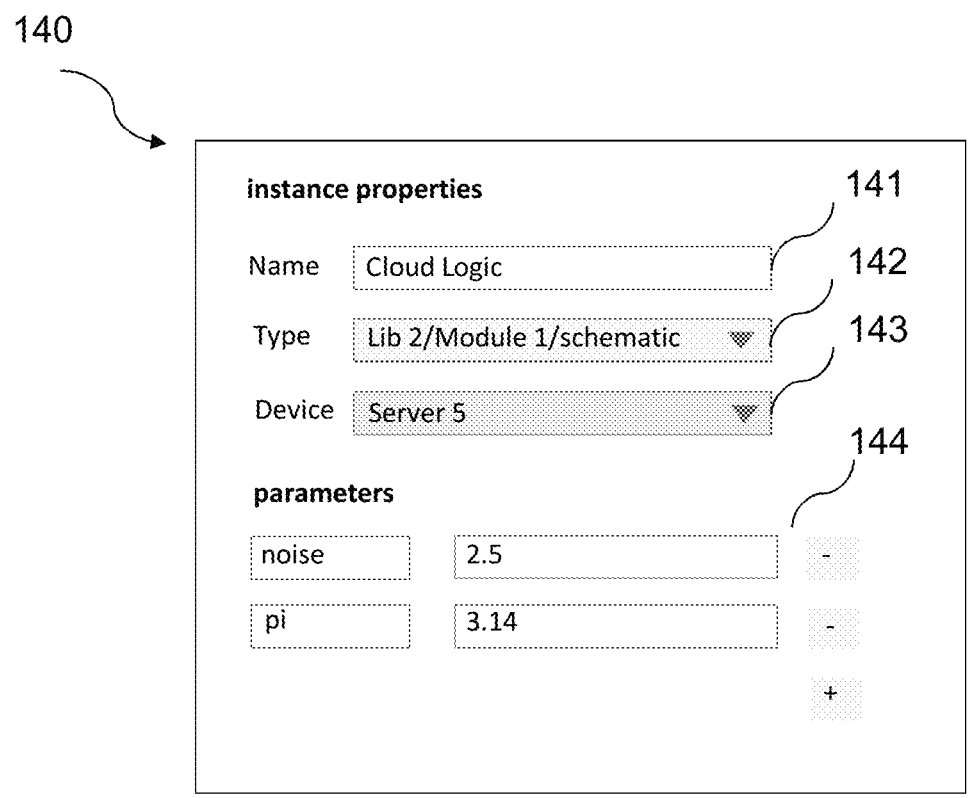
FIG. 14 is a graphical user interface presenting a property table defining properties for a module instance in accordance with an embodiment of the present invention.

FIG. 14 is a graphical user interface presenting a property table 140 defining properties 141, 142, 143, 144 for a module instance in accordance with an embodiment of the present invention. Each instance of a module has a corresponding property table 140 defining instance properties. In an embodiment, as shown in FIG. 14, the module instance property table is implemented as a pop-up window displayed in a graphical user interface. The graphical user interface enables a user to modify properties and parameters of the module instance in the property table 140. The graphical user interface also enables a user to add custom properties and parameters to the property table 140. The property table 140 includes the module instance properties of name 141, type 142, device 143, and parameters 144 for the module instance "Cloud Logic. In property table 140, the module instance property of name 141 is set to "Cloud Logic", and the module instance property of type 142 is set to "Lib 2/Module 1/schematic".

The type property defines the type of instantiation, selected from the parent module, that is used in creating the module instance. For example, a parent module may contain components, such as functional schematics, behavioral schematics, and the device-dependent blocks (as shown for "Module 1" in FIG. 8 and Module 2 in FIG. 10). The module instance type property may be selected, by the user, from the components of the parent module to define the instantiation type for the module instance. In FIG. 14, the module instance "Cloud Logic" is instantiated from the parent module "Module 1" of FIG. 8 and its property type 142 includes one schematic named "schematic", which is located in "Lib 2". Thus, type property for module instance "Cloud Logic" is set to "Lib 2/Module 1/schematic". When the type set for a module instance is a functional schematic, as in FIG. 14, the module instance is configured as a functional module instance. When the type set for a module instance is a behavioral schematic, the module instance is configured as a behavioral module instance. When the type set for a module instance is a device-dependent block, the module instance is configured as a primitive module instance (also simply called a "primitive").

A functional module instance instantiates to the functional schematic set in the type property 142, which may be a system schematic. A schematic, such as system schematic, may contain multiple functional module instances, which each may contain one or more functional schematics. As such, a module instance instantiated to a system schematic may contain a hierarchical structure (hierarchy) of functional schematics. A primitive module instance instantiates to a device-dependent block, which does not have such a hierarchical structure. Note, a "hierarchy" or "hierarchical structure", as referred to in the context of embodiments of the present invention, means a design hierarchy with respect to module instances, rather than a hierarchical code structure inside a device-dependent block (as used in some embodiments of the present invention). The lowest hierarchical levels of a system schematic terminate all module instance paths in primitive module instances.

In property table 140, the module instance property of device 143 is set to "Server 5", indicating the device in which the module instance is to be executed. The design software uses the device property during parsing of a system schematic to determine which target device to transmit the module instance (and allocates the module instance to the associated sub-schematic for that device). In some embodiments, the device property of a module instance is inherited from its parent module at instantiation, such that by default a module instance has the same device property as its parent module. In these embodiments, a user can override the default setting by manually setting the device property for the module instance through the graphical user interface.

In property table 140, the module instance property of parameters is set to two parameters for module property, "noise" and "pi". The parameter "noise" is set to the default value of "2.5" and the parameter "pi" is set to the default value of "3.14" for the module instance "Cloud Logic". The user can change the default values by manually setting values for the parameters through the graphical user interface.

Figure 15:
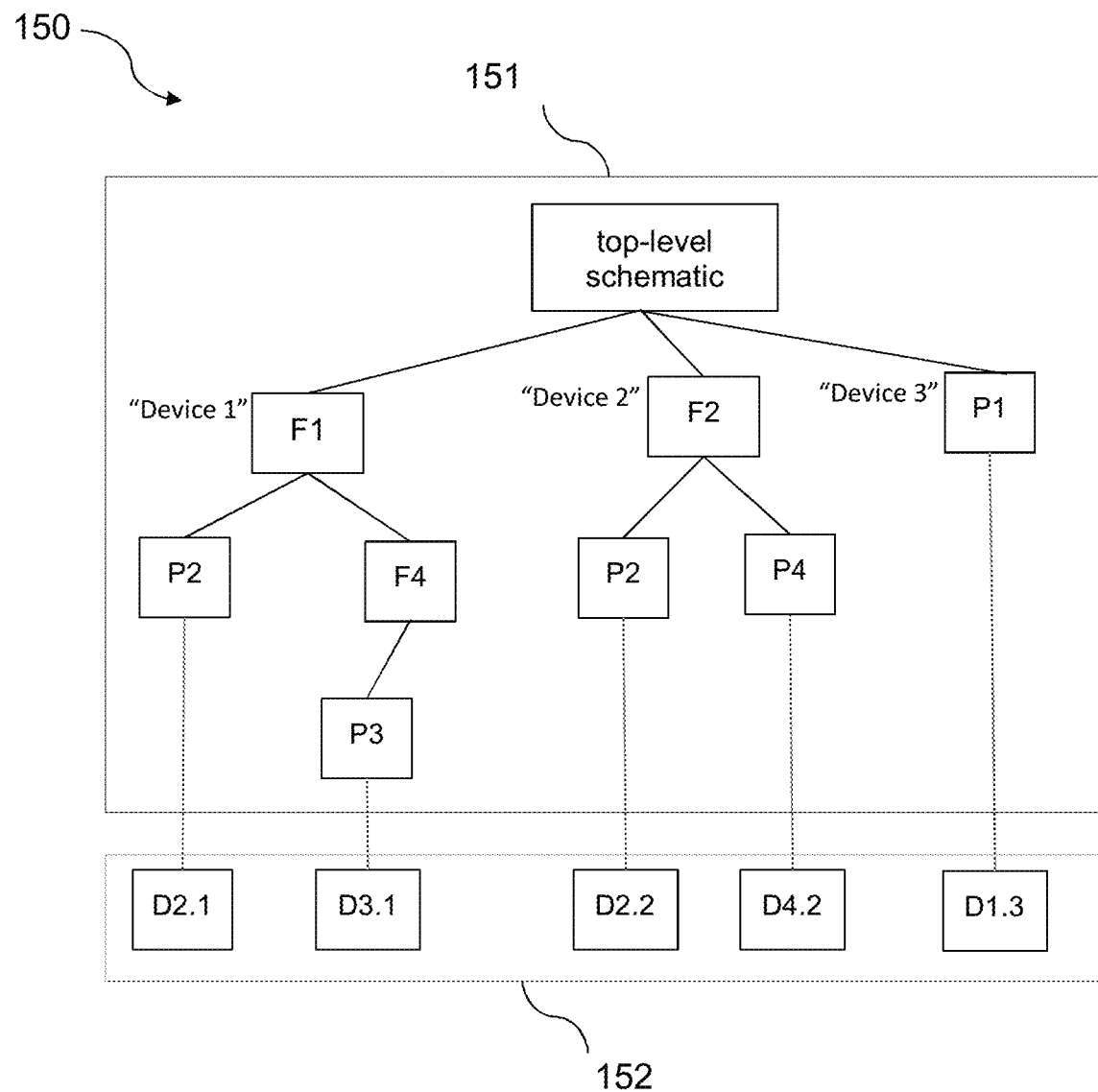
FIG. 15 is a tree graph representing a hierarchical structure of a schematic in accordance with an embodiment of the present invention.

FIG. 15 is a tree graph 150 representing a hierarchical structure of a system schematic 151 in accordance with an embodiment of the present invention. As shown in FIG. 15, the system schematic 151 is a hierarchy of module instances, which contain schemas, functional module instances, and primitive module instances, but not device-dependent blocks. This structure in tree graph 150 enables the system schematic 151 to be device-independent. The identified top-level schematic in the structure is the schematic at the top-level hierarchy of the system schematic 151. The top-level schematic contains three module instances: F1, which is a functional module instance for execution in "Device 1", F2, which is a functional module instance for execution in "Device 2", and P1, which is a primitive module instance for execution in "Device 3". "Device 1", "Device 2", and "Device 3" are each different devices.

At the second level of the hierarchy, the functional module instance F1 contains two module instances: P2, which is a primitive module instance, and F4, which is a functional module instance. The functional module instance F2 contains two module instances: P2 and P4, which are both primitive module instances. Note that primitive module instance P2 is in both functional modules F1 and in F2. At the third level of the hierarchy, the functional module instance F4 contains a single primitive module instance P3. P1, P2, P3, and P4, are leaf module instances, which does not have any child module instance. As module instances P2, F4, and P3 are all child module instances of module instance F1, they each inherit the device property "Device 1" of F1. As module instances P2 and P4 are all child module instances of module instance F2, they each inherit the device property "Device 2" of F2. The user may override the device property for P2, F4, P3, P4 by making a manual selection of device property in the instance property tables corresponding to these module instances.

In the structure of system schematic 151, each hierarchical path terminates in a primitive module instance (leaf module instance P1, P2, P3, and P4) that is associated with a device-dependent block, as shown by 152. That is, P1 is associated with device-dependent block D1.3, P2 is associated with device-dependent blocks D2.1 and D2.2, P3 is associated with device-dependent block D3.1, and P4 is associated with device-dependent block D4.2. In embodiments, a device-dependent block must be configured for each primitive module instance. Note that in system schematic 151, primitive module instance P2 is used twice, once in functional module instance F1 and once in functional module instance F2. As F1 and F2 execute in different types of devices, namely Device 1 and Device 2, respectively, two different device-dependent blocks, namely D2.1 and D2.2, must be contained in P2. When F1 is loaded at "Device 1", the device-dependent block D2.1 for the device type of Device 1 is also loaded in Device 1. When F2 is loaded at "Device 2", the device-dependent block D2.2 for the device type of Device 2 is also loaded in "Device 2".

Even though the system schematic 151 is device-independent (i.e., device-dependent blocks are not include in the hierarchical structure of the system schematic 151 as shown by 152), both the design software and the devices have sufficient context to locate the correct device-dependent blocks for the devices in the distributed heterogeneous computing and control system. Each device in the distributed heterogeneous system is assigned, by the computer node executing the design software, a unique identifier (ID), and may also be assigned a corresponding device name (which may be graphically inscribed by the user through the graphical interface). The correct selection of a device-dependent block is made based on the device property specified for each module instance in its property table. The device property contains a device ID or device name of a device. When a device name is specified in the device property, the design software can locate the corresponding device ID. Using the device ID, the design software can look up the device type corresponding to that device ID. When the device type is found, the design software can locate the device-dependent block corresponding to that device type.

In some embodiments of the present invention, when a module instance included in the system schematic 151 is associated with a device, the device-dependent block for the device is pre-loaded in the device. In some embodiments, when a module instance included in a system schematic is associated with a device, the design software transmits the corresponding device-dependent block to the device.

Figure 16:
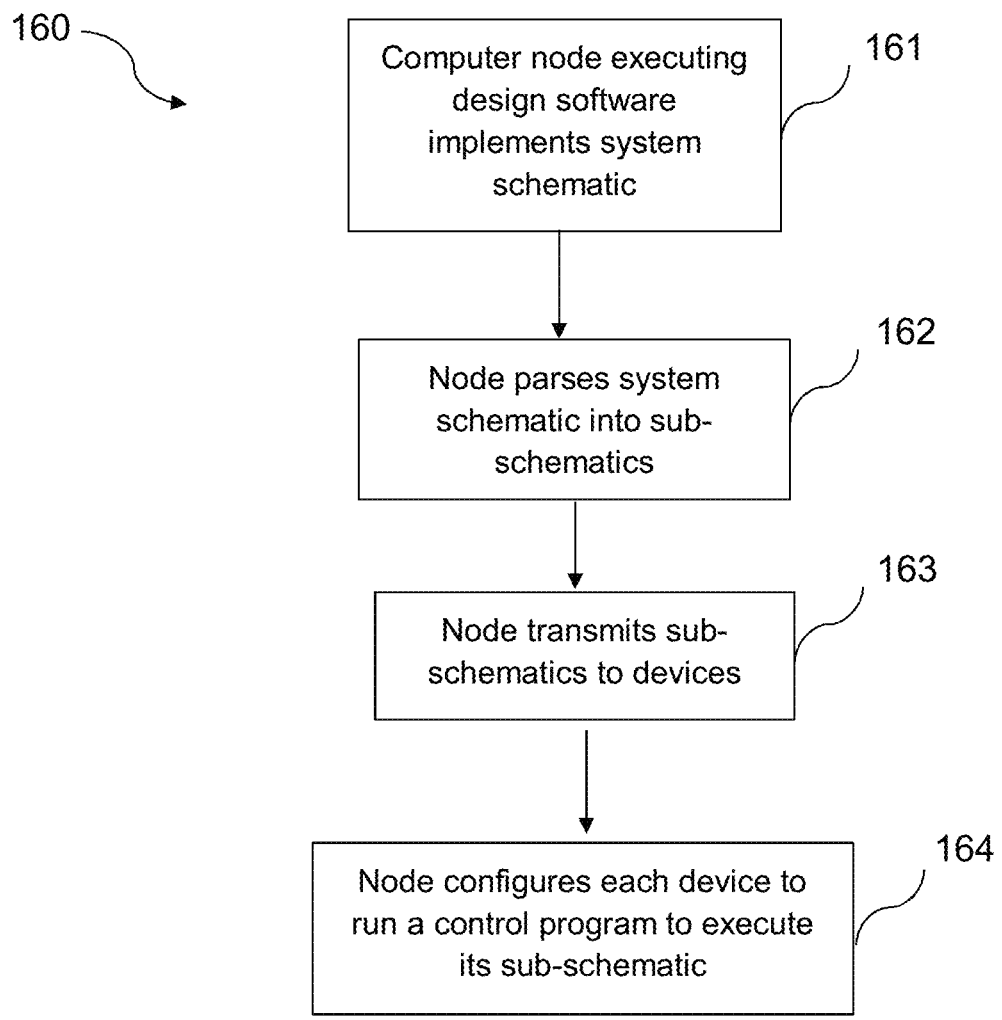
FIG. 16 is a flowchart illustrating a method 35 of utilizing a schematic to design an application for a distributed heterogeneous computing and control system in accordance with an embodiment of the present invention.

FIG. 16 is a flowchart illustrating a method 160 of utilizing a schematic to design an application for a distributed heterogeneous computing and control system in accordance with an embodiment of the present invention. The user implements the schematic for the system using design software instructions that are executed in a computer node, and accessible to the user through an associated user interface, to establish an interactive environment for the user. Through implementation of the system schematic, the user designs the application in a hardware context, such that the hardware of each device of the system is represented in the system schematic.

To implement the system schematic, in first process 161 of method 160, the computer node executed design software to implement the system schematic. To do so, the computer nodes provides the user access, in the interactive environment, to a set of functional modules and a set of primitive modules to define the system schematic. The set of functional modules includes one or more functional schematics. Each functional schematic is a graphical representation of an application function and is independent of hardware context and software configuration. The set of primitive modules includes one or more device-dependent blocks. Each device-dependent block is application code written for a particular device of the distributed heterogeneous computing and control system, wherein the structure and content of the code depend on the configuration of a member selected from the group consisting of the hardware environment of the device, the software environment for the code, and combinations thereof, and are typically different for different types of devices.

A special type of schematic also exists in embodiments, referred to as a behavioral schematic. A behavioral schematic is typically a model of a functional schematic or a device-dependent block, such as a simplified model or a statistical module. Unlike a functional schematic, a behavioral schematic is used in a simulation context, rather than for execution on a physical device of the distributed heterogeneous system. The simulation context is typically performed in the design software for understanding issues associated with the distributed heterogeneous system, such as statistical variations, corner cases, and special input conditions. The user may also be provided access to a set of behavioral modules that includes one or more behavioral schematics. The user may also be provided access to other components that are used in implementing the system schematic. Any of the modules and components can be graphically selected by the user through the interactive environment.

The computer node receives, in the interactive environment, a selection of desired ones of the functional modules, primitive modules and input that orders them to implement the system schematic. The computer node may also receive, in the interactive environment, selection of desired ones of the behavior modules and input that orders them to implement the system schematic. In some embodiments, the selection of the desired ones creates module instances of the corresponding functional modules and primitive modules, and the input orders the module instances to implement the system schematic. The computer node may also receive, in the interactive environment, a selection of a virtual wire, and input to configure the virtual wire in the system schematic between a pair of modules (or module instances) that are to be in communication with one another in the system.

In a second process 162, the computer node parses the system schematic to produce a set of sub-schematics, such that each sub-schematic corresponds to a device of the set of devices in the distributed heterogeneous computing and control system. In a third process 163, the computer node transmits each sub-schematic to its corresponding device, so that the device can execute the application functions of the designed application allocated to the device in the sub-schematic. In a fourth process 163, the computer node configures each device to execute its corresponding sub-schematic via a corresponding control program running inside the device.

Figure 17:
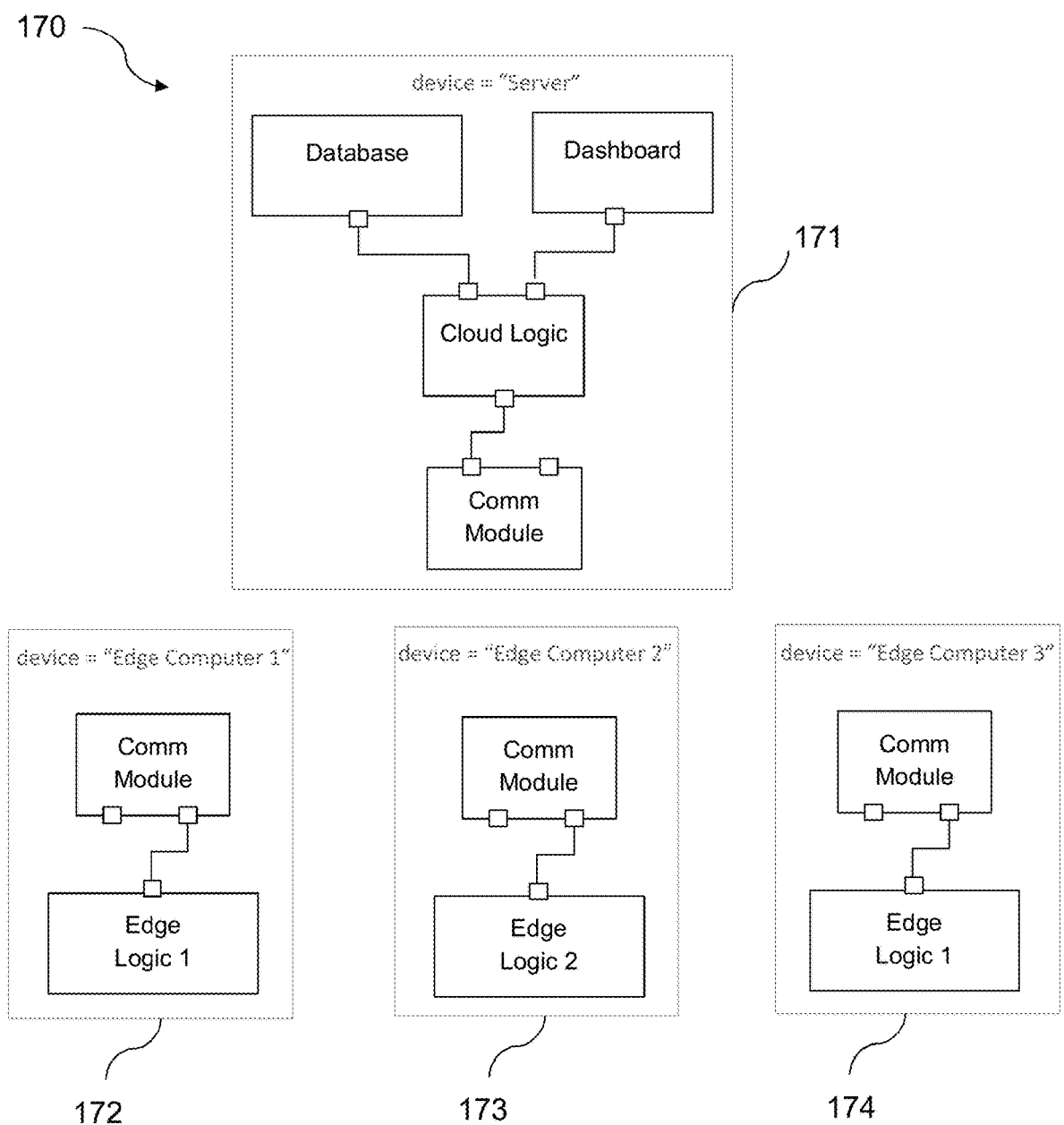
FIG. 17 is a block diagram of sub-schematics parsed from the schematic of FIG. 13 in accordance with an embodiment of the present invention.

FIG. 17 is a block diagram of sub-schematics parsed from the system schematic 130 of FIG. 13 in accordance with an embodiment of the present invention. Once a system schematic, such as system schematic 130, is designed, the system schematic must be parsed into sub-schematics. Each of the parsed sub-schematics is a portion of the system schematic that is targeted for a particular distributed heterogeneous device. The design software transmits the sub-schematics to their distributed heterogeneous devices, where the sub-schematics are executed via control programs running in the respective devices.

FIG. 17 shows exemplary parsed sub-schematics corresponding to the system schematic 130. The module instances of FIG. 13 are associated with four devices in a distributed heterogeneous system: Server, Edge Computer 1, Edge Computer 2, and Edge Computer 3. A sub-schematic is parsed from the system schematic for each of the four devices. That is, sub-schematic 171 is parsed from the system schematic for the Server, sub-schematic 172 is parsed from the system schematic for the Edge Computer 1, sub-schematic 173 is parsed from the system schematic for the Edge Computer 2, and sub-schematic 174 is parsed from the system schematic for the Edge Computer 3.

During the parsing, the module instances in the system schematic 130 are assigned to the sub-schematic associated with the device that these module instances are to be executed. Specifically, the module instances Database, Dashboard, and Cloud Logic are assigned to sub-schematic 171 for device Server. Note in other embodiments, the module instances of "Database" and "Dashboard" may not be executed in the same Server device as "Cloud Logic". Further, the module instance Edge Logic 1 is assigned to the sub-schematic 172 for device Edge Computer 1, the module instance Edge Logic 2 is assigned to the sub-schematic 173 for device Edge Computer 2, and the module instance Edge Logic 3 is assigned to the sub-schematic 174 for device Edge Computer 3. If a virtual wire exists between a pair of module instances in the system schematic 130, but each module instance of the pair is parsed into two separate sub-schematics, the virtual wires are replaced by a comm module instance in each of the two sub-schematics. The comm module instances are configured to provide the communication and data flow between the two separate sub-schematics. For example, in the system schematic 130, the Cloud Logic is connected to the Edge Logic 1 via a virtual wire. The Cloud Logic is parsed into sub-schematic 171 together with a comm module and Edge Logic 1 is parsed into sub-schematic 172 together with a comm module. The comm modules in sub-schematics 171 and 172 are configured to facilitate the communication and data flow between sub-schematics 171 and 172.

Figure 18:
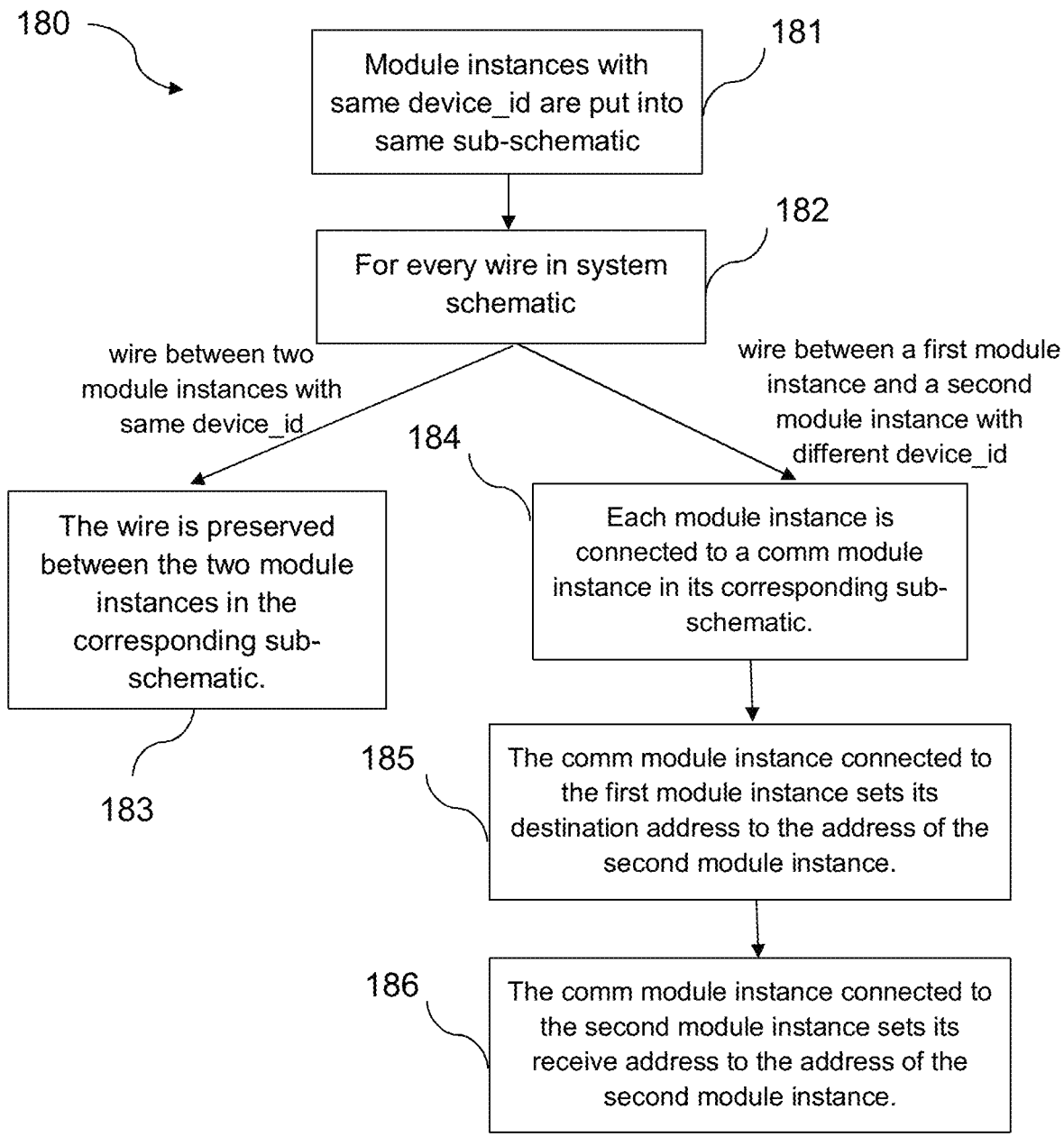
FIG. 18 is a flowchart illustrating a method of parsing a schematic into sub-schematics in accordance with an embodiment of the present invention.

FIG. 18 is a flowchart illustrating a method 180 of parsing a schematic into sub-schematics in accordance with an embodiment of the present invention. As shown in FIG. 17, the parsing process involves two separate processes: parsing module instances and parsing virtual wires. In a first process 181 of method 180, the computer node executing the design software parses the module instances in the schematic into sub-schematics. In this first process 181, the computer node parses the module instances into sub-schematics based on their device property. Each sub-schematic is configured for a particular device in the distributed heterogeneous system. Each module instance contains a device property set to a unique device identifier (ID) indicating the device associated with the module instance. Each module instance associated with the same device is parsed into the same sub-schematic for that device. This procedure applies to all module instances across all hierarchy levels of the system schematic.

In a second process 182, the computer node parses every virtual wire in the system schematic. In parsing the virtual wires, each virtual wire in the system schematic is examined. If the virtual wire connects two module instances with the same device property (i.e., the two modules instances are parsed into the same sub-schematic), in a third process 183, the computer node preserves the virtual wire at the location between the two module instances in the sub-schematic. If the virtual wire connects two module instances with different device properties (i.e., the two modules instances are parsed into separate sub-schematics), in a fourth process 184, the computer node adds a comm module instance to each of the separate sub-schematics. Each module instance is then connected to the comm module instance added to its corresponding sub-schematic. That is, a virtual wire connects the output of a first module instance to the input of a second module instance in the system schematic. The first module instance is parsed into a first sub-schematic and the second module instance is parsed into a second sub-schematic. A first comm module instance created in the first sub-schematic, and a virtual wire is added from the output of the first module instance to the input of the first comm module instance. A second comm module instance is created in the second sub-schematic, and a virtual wire is added from the output of the second comm module instance to the input of the second module instance.

In a fourth process 185, the computer node sets the destination address of the first comm module instance connected to the first module instance to the address of the second module instance. In a fifth process 186, the computer node sets the receive address of the second comm module instance connected to the second module instance to the address of the second module instance. Based on this addressing, the first comm module may communicate data received from the first module instance to the second comm module in a different sub-schematic and device, which transmits the data to the second module instance.

Figure 19:
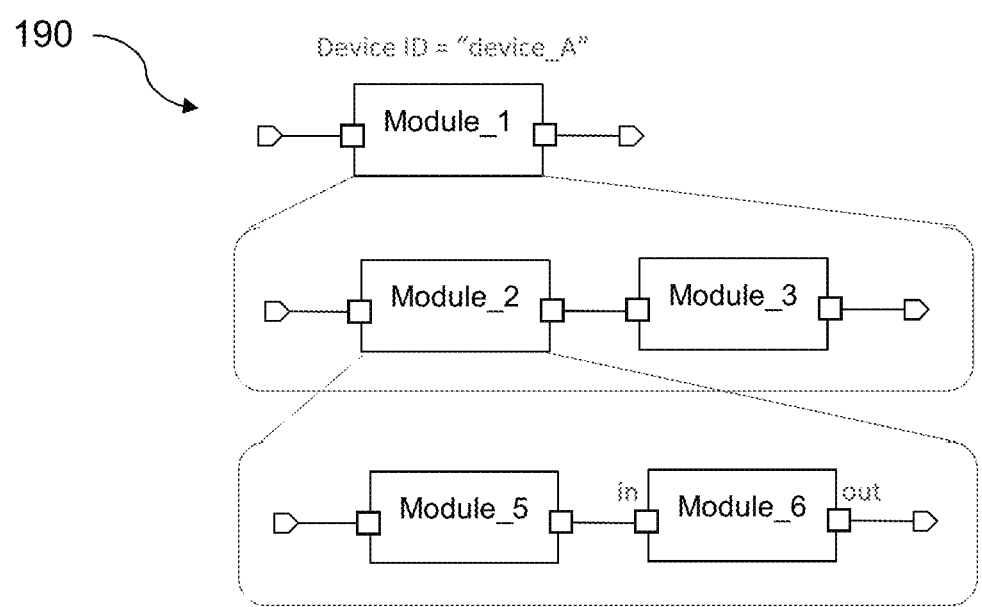
FIG. 19 is a block diagram illustrating logical flow for addressing a component of a schematic in accordance with an embodiment of the present invention.

FIG. 19 is a block diagram illustrating logical flow 190 for addressing a component of a schematic in accordance with an embodiment of the present invention. In the system schematic, the computer node assigns each component (e.g., module, pin, virtual wire, etc.) a unique address. The assigned address is used to identify the precise location of the component within the system schematic. As will be described later, this address is also used to identify the precise location of the component when parsed into a sub-schematic and to set communication addresses for the component.

An embodiment of an addressing method in the present invention addresses a component of a schematic as a combination of: (i) a device ID, (ii) a path to the component, and (iii) name of the component. In the system schematic, the device ID is set to the simulation virtual device ID of Designer. In a sub-schematic, the device ID identifies a device in the distributed heterogeneous system associated with the sub-schematic. The path of the component is defined as the hierarchical path, such that the path defines a name of each module instance to be traversed in hierarchical order within the system schematic or sub-schematic to reach the given component. FIG. 19 illustrates a system schematic that contains a module instance, Module_1. The module instance, Module_1, is configured to be executed in device_A. In the system schematic, Module_1 is instantiated into a schematic containing two module instances, Module_2 and Module_3. In the system schematic, Module_2 is further instantiated into a schematic containing two module instances, Module_5 and Module_6. Module_6 has an input pin named "in" and output pin "out".

In the system schematic, the device ID of the simulation virtual device is "Designer", and the hierarchical path to pin "in" is "Module_1/Module_2/Module_6". Thus, in the system schematic, the address of pin "in" is "Designer/Module_1/Module_2/Module_6/in. As a result of parsing the system schematic into sub-schematics, "Module_1" (along with all its children) is placed into a sub-schematic corresponding to "device_A". In this sub-schematic, the device ID is "device_A", and the hierarchical path to pin "in" is still "Module_1/Module_2/Module_6". Thus, in this sub-schematic, the address of pin "in" is "device_A/Module_1/Module_2/Module_6/in". Note that the only change between the address of pin "in" in the system schematic and sub-schematic is the device ID, while the rest of the address is preserved. This is a huge advantage of this addressing method, as it allows any component in the system schematic to be easily located in a corresponding sub-schematic.

Figure 20:
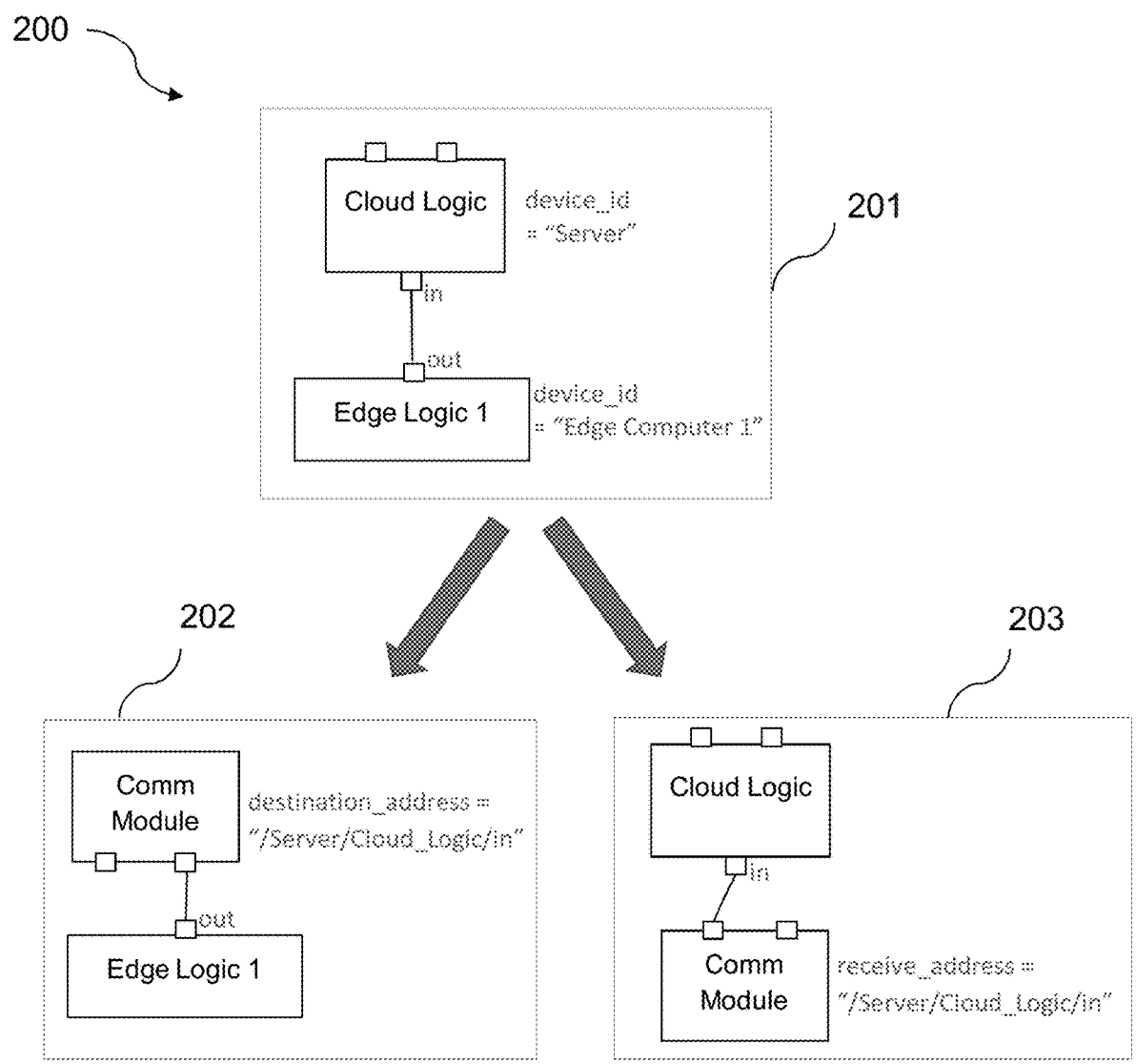
FIG. 20 is a block diagram illustrating a method of addressing used when parsing a schematic into sub-schematics in accordance with an embodiment of the present invention.

FIG. 20 is a block diagram illustrating a method 200 of addressing used when parsing a schematic 201 into sub-schematics 202, 203 in accordance with an embodiment of the present invention. For example, FIG. 20 illustrates the use of the unique addressing method of FIG. 19 when parsing schematic 201. FIG. 20 shows an exemplary system schematic 201 containing two module instances, "Edge Logic 1" and "Cloud Logic". These two module instances are configured to execute in two different devices, "Edge Computer 1" and "Server", respectively. These two module instances are configured such that the output of "Edge Logic 1" is connected to the input of "Cloud Logic".

The system schematic 201 is parsed into a first sub-schematic 202 for Edge computer 1 and a second sub-schematic 203 for Server 203. The first sub-schematic 202 contains module instance "Edge Logic 1" and a comm module instance to replace the virtual wire between the "Cloud Logic" module instance and the "Edge Logic 1" module instance in the system schematic 201. In the first sub-schematic 202, a virtual wire connects the output of the "Edge Logic 1" module instance to the input of the comm module instance. The second sub-schematic 203 contains module instance "Cloud Logic" and a comm module instance. In the second sub-schematic 203, a virtual wire connects the output of the comm module instance to the input of the "Cloud Logic" module instance to replace the virtual wire between the "Cloud Logic" module instance and the "Edge Logic 1" module instance in the system schematic 201. Using the addressing method of FIG. 19, the input pin of the "Cloud Logic" module instance is "/Server/Cloud Logic/in".

In the first sub-schematic 202, the destination address of the comm module instance is set to the address of the input pin of the "Cloud Logic" module instance, "/Server/Cloud Logic/in". In the second sub-schematic 202, the receive address of the comm module is also set to the address of the input pin of the "Cloud Logic" module instance, "/Server/Cloud Logic/in". Based on this addressing, the comm modules may communication data between the "Cloud Logic" module instance and "Edge Logic 1" module instance in different sub-schematics and devices. In this embodiment, both the destination address of the first sub-schematic 202 and the receive address of the second sub-schematic are the address of the input pin on the receiving module instance ("Cloud Logic"). As shown in FIG. 19, this address is easy to generate based on the address of the input pin and the device property of the receiving module instance. Further, the addressing method using this address works well, even if the system schematic contains a large number of module instances with complex hierarchical structures.

Another embodiment of an addressing method in the present invention addresses a component of a schematic as a combination of: (i) a device ID, (ii) a module instance ID, and (ii) the component name. If the component is a module instance, then the component name can be omitted from the address. In the system schematic, the device ID is set to the simulation virtual device ID of "Designer". In a sub-schematic, the device ID identifies a device in the distributed heterogeneous computing and control system associated with the sub-schematic. If the component is a module instance, the module instance ID is for that module instance. If the component is not a module instance, the module instance ID is for the module instance associated with the component. A module instance ID is a unique identifier for a module instance in the system schematic, and it is typically auto-generated by the design software and is a random string or number. A module instance ID differs from a module instance name in that a module instance name does not need to be unique in the system schematic. The module instance name is typically defined by the user and is human readable.

Applying this addressing method to the system schematic of FIG. 19, the address of pin "in" of "Module_6" is set to "/device_A/29f.ab2/in", where "29f.ab2" is the unique module instance ID of "Module_6". The advantage of this addressing method is that when a system schematic has many hierarchy levels, the address can be much shorter. In another embodiment of the present invention, the design software may use both the path-based addressing method of FIG. 19 and this module instance ID-based method. Such application of the addressing methods is possible when the module instance ID has a unique regular expression, e.g., three alphanumerics followed by a dot followed by three more alphanumerics, such that a module instance ID-based address can be distinguished from a path-based address.

Figure 21:
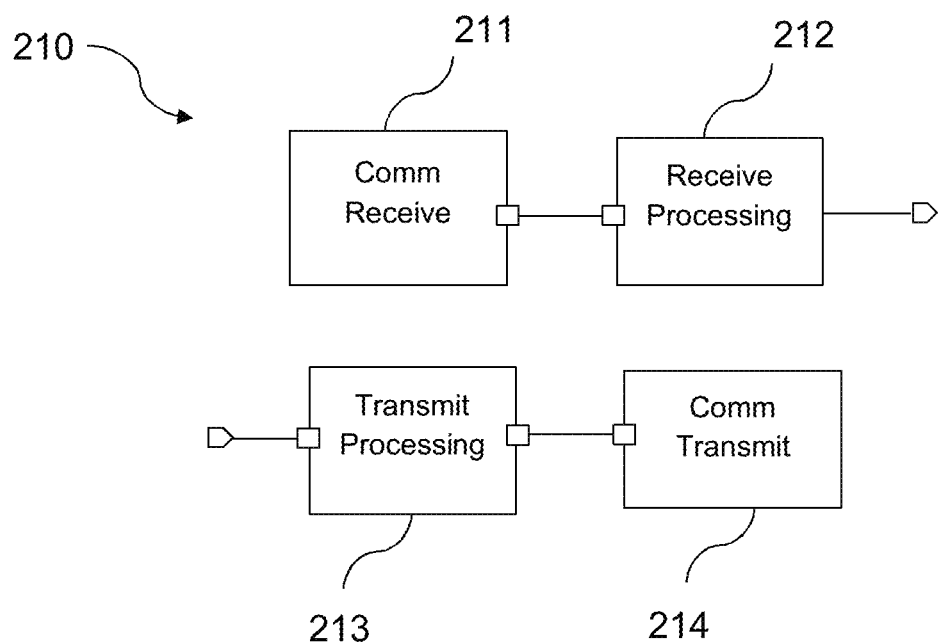
FIG. 21 is a block diagram of components of a comm module in accordance with an embodiment of the present invention.

FIG. 21 is a block diagram of components 211, 212, 213, 214 of a comm module 210 in accordance with an embodiment of the present invention. The components 211, 212, 213, 214 are module instances that form a functional schematic of the comm module 210. The functional schematic enables communication and data flow over a network between two instances of the comm module 210 executed in different devices.

The functional schematic of the comm module 210 has a receive path, which includes the comm receive module instance 211 and the receiving processing module instance 212. The comm receive module instance 211 receives data transmitted over the network to a module instance coupled to the comm module 210. The receiving processing module instance 212 post-processes the received data (e.g., prepares the data for use by the module instance coupled to the comm module 210). The functional schematic of the comm module 210 also has a transmit path, which includes the comm transit module instance 214 and the transmit processing module instance 213. The transmit processing module instance 213 pre-processes data for transmission over a network (e.g., prepares data from the module instance coupled to the comm module 210 for communication over the network). The comm transit module instance 214 transmits, over the network, the data from the coupled module instance.

In embodiments, multiple functional schematics of the comm module 210 can be implemented to support different communication protocols, such as TCP, HTTP, MQTT, etc., for communicating data over the network. In embodiments, the user can set the communication protocol for an instance of the comm module 210 using a comm module instance type property in the comm module instance property table. In embodiments, through a graphical user interface associated with the design software, the user can change the comm module instance type for a given comm module instance. In embodiments, through a graphical user interface associated with the design software, the user can globally change the comm module instance type for all comm module instances. Changing the comm module instance type in such manners allows the user to easily switch communication protocols.

Figure 22:
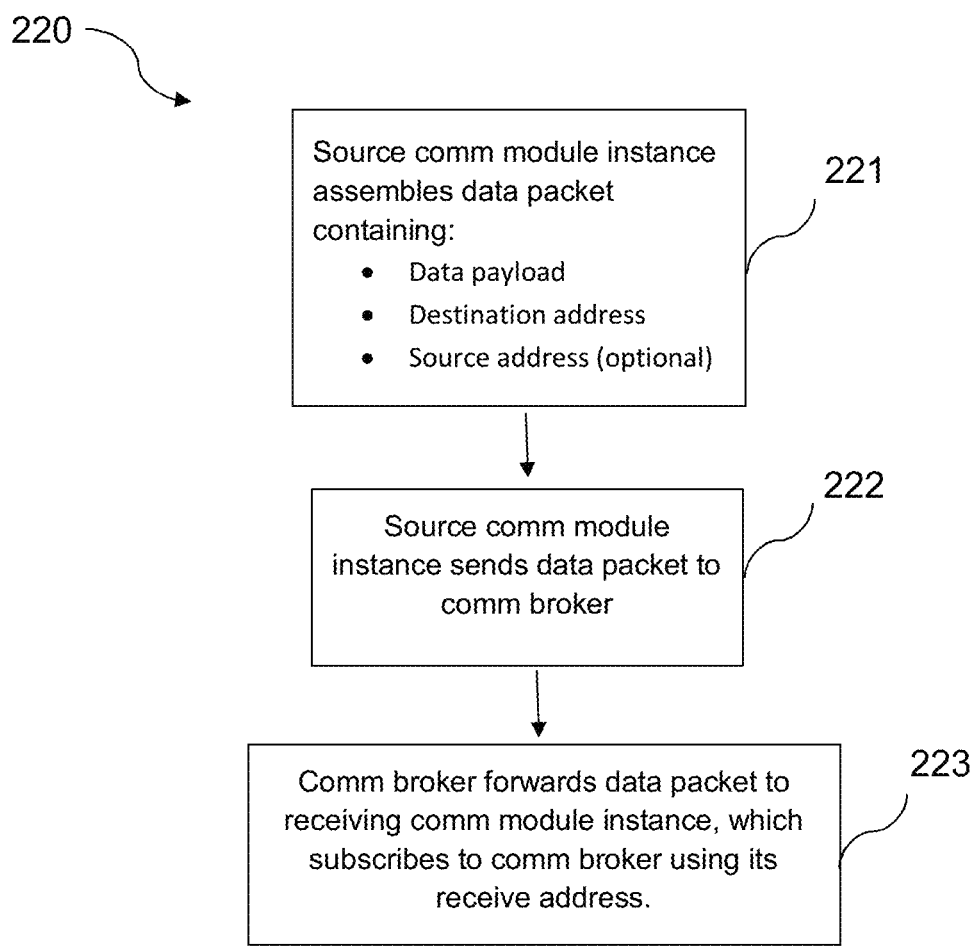
FIG. 22 is a flowchart illustrating a method of communicating data using a publish/subscribe protocol in accordance with an embodiment of the present invention.

FIG. 22 is a flowchart illustrating a method 220 of communicating data using a publish/subscribe protocol in accordance with an embodiment of the present invention. In embodiments, a computer node configures, on a computing device, the central communication (comm) broker, which utilizes the publish/subscribe protocol for communication between a source comm module instance and a destination comm module instance. The comm module instances perform the publish function on the transmit side and the subscribe function on the receive side of the communication. Prior to execution of method 220, the destination comm module instance subscribes with the central comm broker by transmitting to the central comm broker a subscription request which specifies at least one receive address of the destination comm module instance.

In a first process 121 of method 220, the source comm module instance assembles a data packet for transmission over a network. The data packet contains a data payload, a destination address, and, optionally, a source address. In embodiments, the source address is the address of an output pin of a module instance coupled to the source comm module instance. In a second process 222, the source comm module instance sends the data packet to the central comm broker. When the destination address in the data packet matches the receive address of the destination comm module instance, in a third process 223, the central comm broker forwards the data packet to the destination comm module instance for processing.

The "publish/subscribe" communication protocol of FIG. 22 may be used as an alternate to the virtual wire replacement method described in FIG. 18. In embodiments, the addressing method described in FIGS. 19 and 20 may be used to configure the destination address and source address in the data packet and the receive address of the destination comm module instance.

Figure 23:
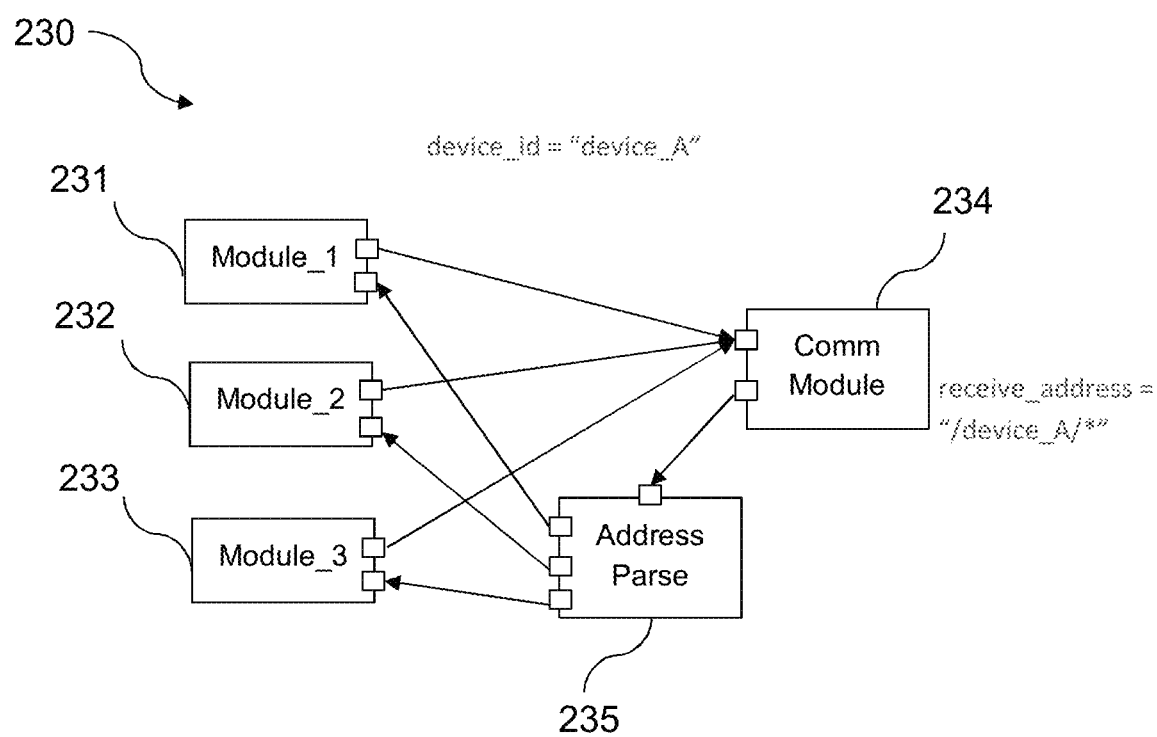
FIG. 23 is a block diagram illustrating logic flow of replacing virtual wires between module instances in accordance with an embodiment of the present invention.

FIG. 23 is a block diagram illustrating logic flow 230 of replacing virtual wires between module instances in accordance with an embodiment of the present invention. The virtual wire replacement method of FIG. 23 is an alternative to the method described in FIG. 18. In the method 180 shown in FIG. 18, in each sub-schematic, the design software configures a pair of comm module instances for each virtual wire, which results in the additional of a large number of com module instances to the system application. In the method shown in FIG. 23, for a given sub-schematic, the design software configures a comm module instance that is shared among multiple module instances.

FIG. 23 shows a sub-schematic having three module instances, Module_1 231, Module_2 232, and Module_3 233, a comm module instance 234, and an address parse module instance 235. The design software configures the module instances (Module_1 231, Module_2 232, and Module_3 233) to share the transmit path of the comm module instance 234. Specifically, when a module instance (Module_1 231, Module_2 232, and Module_3 233) needs to transmit data over a virtual wire connection, the module instance transmits its destination address and the data payload to the same comm module instance 234. The comm module instance 234 then forms a data packet containing the destination address and data payload and transmits the data packet over the network.

The design software configures the receive path of the comm module instance 234 to receive all data packets destined to the module instances (Module_1 231, Module_2 232, and Module_3 233). Specifically, the design software configures the receive address of the comm module instance 234 to receive all data packets destined to any sub-schematic component in the device executing the sub-schematic, including those destined to the input pin of a module instance (Module_1 231, Module_2 232, and Module_3 233). For example, if the device executing the sub-schematic is "device_A", then the design software sets the receive address of the comm module instance 234 to "/device_A/*", so that the comm module instance 234 receives any data packets with a destination address matching a component of the sub-schematic in "device_A", such as addresses "/device_A/Module_1/in1", "/device_A/Module_2/in2", "/device_A/Module_3/in3", etc.

The comm module instance 234 then forwards the data packet to an address parse module 235. The address parse module 235 examines the full destination address of the data packet to determine the intended destination of the data packet in the sub-schematic, and forwards the data packet to that intended destination. For example, when the destination address of the packet is "/device_A/Module_2/in2", the address parse module 235 forwards the data packet to the input pin ("in2") of Module_2.

Figure 24:
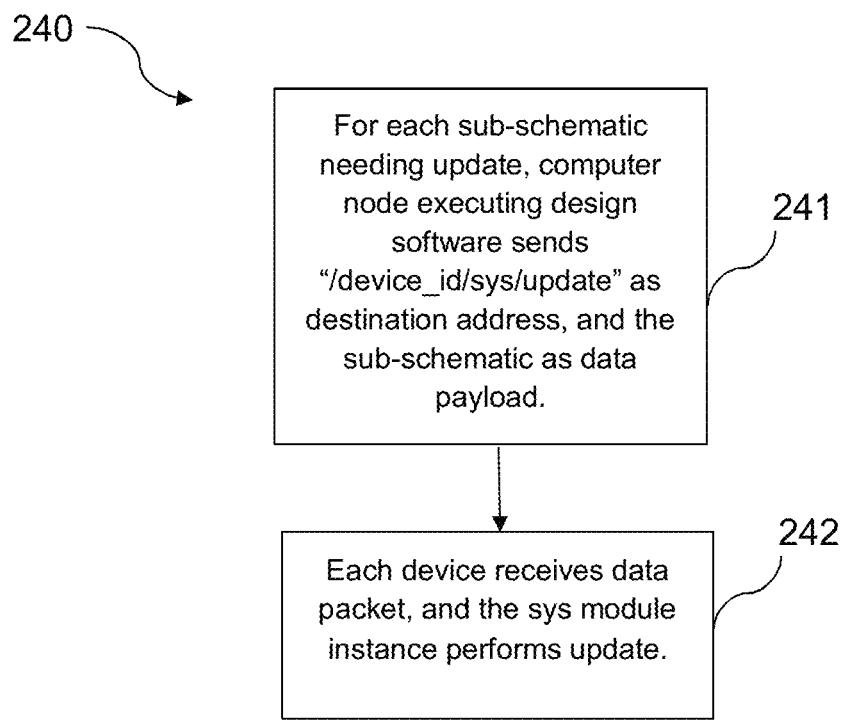
FIG. 24 is a flowchart illustrating a method of updating a sub-schematic for execution in a device in accordance with an embodiment of the present invention.

FIG. 24 is a flowchart illustrating a method 240 of updating a sub-schematic for execution in a device in accordance with an embodiment of the present invention. Prior to execution of method 240, each device of the set of devices in a distributed heterogeneous system is pre-loaded with a control program and an init schematic. The init schematic has a comm module instance coupled to a sys module instance, which is further coupled to an update module instance. The update module instance is configured to perform an update of the sub-schematic executing on the device. In each device, when the device is powered on, the control program executes the init schematic pre-loaded on the device.

Once the design software parses a system schematic into sub-schematics, the design software sends the sub-schematics to their corresponding devices for execution. For each sub-schematic, in a first process 241 of method 240, the computer node executing the design software sends a data packet to the corresponding device. The data packet has a data payload containing the sub-schematic and a destination address set to the update module instance executing on the corresponding device. For example, if a sub-schematic is for execution on a corresponding device with a device ID set to "device_id", the destination address is set to "/device_id/sys/update". In an embodiment, a netlist, which is the text representation of a schematic, representing the sub-schematic is used as the data payload in the data packet. In a second process 242, each device receives the respective data packet containing a destination address that includes a device_id matching the device. Based on the destination address, the device forwards the received data packet to the update module instance coupled to the sys module instance of the init schematic. The update module instance performs an update to the device by loading the sub-schematic contained as the data payload of the data packet and causing the control program to execute the loaded sub-schematic.

If changes are made to the system schematic, once the design software parses the changed system schematic into sub-schematics, the method 240 (processes 241 and 242) are repeated to update the corresponding device with the changed system schematic. In embodiments, the loaded sub-schematic may also have a comm module instance coupled to a sys module instance, which is further coupled to an update module instance. In some of these embodiments, in repeating the method 240, the device forwards the received data packet to the update module instance coupled to the sys module instance of the executing sub-schematic.

Figure 25:
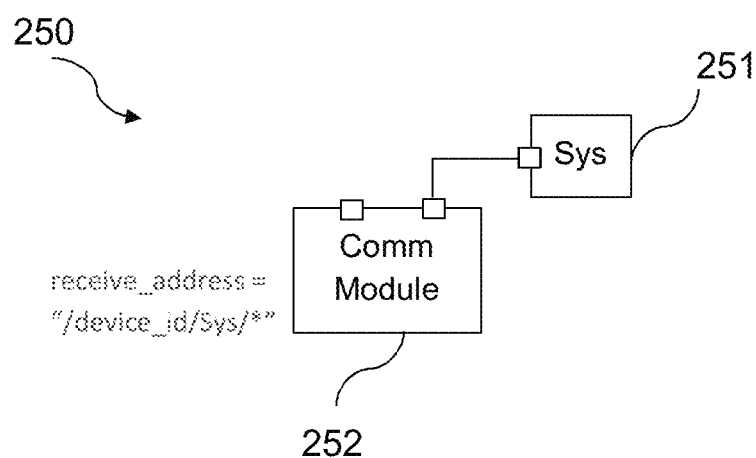
FIG. 25 is a block diagram of an init schematic in accordance with an embodiment of the present invention.

FIG. 25 is a block diagram of an init schematic 250 in accordance with an embodiment of the present invention. An init schematic 250 is loaded and executed in devices of the distributed heterogeneous system. In an embodiment, the init schematic is pre-loaded into each device, so that when the device is powered on, the device executes the init schematic. Such execution enables the device to receive a sub-schematic update from the design software, even when a sub-schematic is not yet loaded and executed in the device.

As shown in FIG. 25, the init schematic 250 includes a comm module instance 252 coupled with a sys module instance 251. The receive address of the coupled sys module instance 215 (coupled with the comm module instance 252), executing on a given device with device ID "device_id", is set to "/device_id/sys/*". In the init schematic 250, a sub-schematic update destined to this receive address is received by the sys module instance 251, which performs the sub-schematic update to load and execute the sub-schematic contained in the update.

Figure 26:
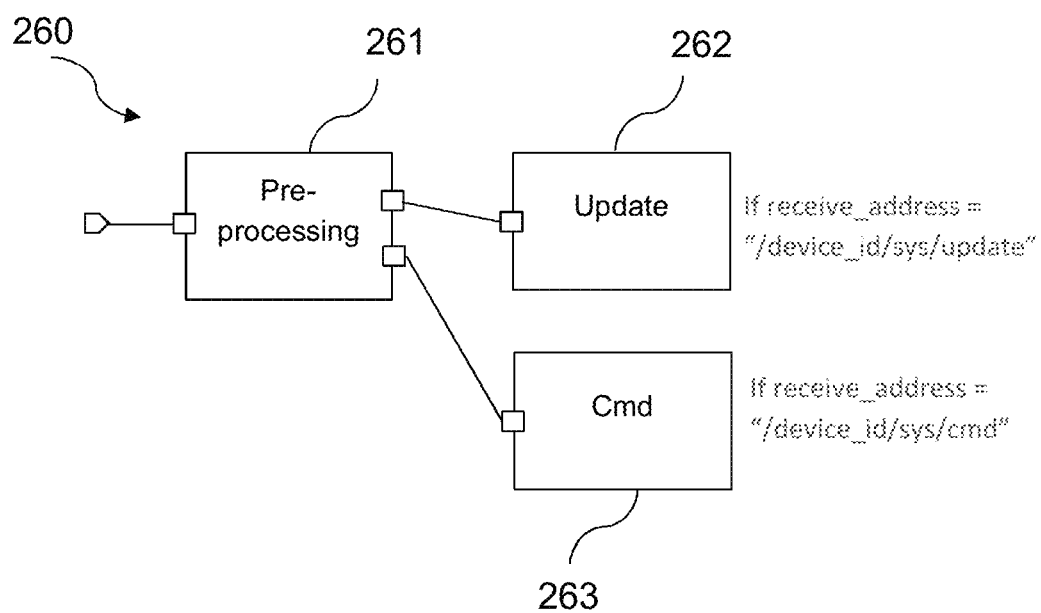
FIG. 26 is a block diagram illustrating an instantiated sys module in accordance with an embodiment of the present invention.

FIG. 26 is a block diagram illustrating an instantiated sys module 260 in accordance with an embodiment of the present invention. In an embodiment, the instantiated sys module 260 is the sys module instance 251 of FIG. 25. The instantiated sys module 260 (also called a sys module instance) of FIG. 26 includes a pre-processing module instance 261. A data packet is received by the sys module instance 260, when the destination address of the data packet matches the address "/device_id/sys/*", where device_id is the identifier of the device executing the sys module instance 260. The pre-processing module instance 260 routes the received data to a processing module instance (e.g., update module instance 262, cmd module instance, 263, etc.) included in the sys module instance 260. Each of the processing module instances 262, 263, etc. has a receive address and configured to perform specific processing of the data packet. For example, the receive address of the update module instance 262 is "/device_id/sys/update" and it is configured to perform sub-schematic updates. For another example, the receive address of the cmd module instance 263 is "/device_id/sys/cmd", and it is configured to perform one or more system commands contained in the data payload of the data packet.

The pre-processing module instance 261 routes the received data packets to a processing module instance based on the destination address in the data packet matching the processing module instance. For example, when the destination address in the data packet matches "/device_id/sys/update", the pre-processing module 261 forwards the received data packet to the update module instance 262, which performs the sub-schematic update. In one embodiment of the present invention, the update module instance 262 saves the received sub-schematic, contained in the data payload of the data packet, as a file on the hard drive of the device. The update module instance 262 then requests (e.g., via a reload request) the control program running in the device to execute the sub-schematic. For another example, when the destination address in the data packet matches "/device_id/sys/cmd", the pre-processing module 261 forwards the received data packet to the cmd module instance 263, which executes the one or more system commands contained in the data packet.

Figure 27:
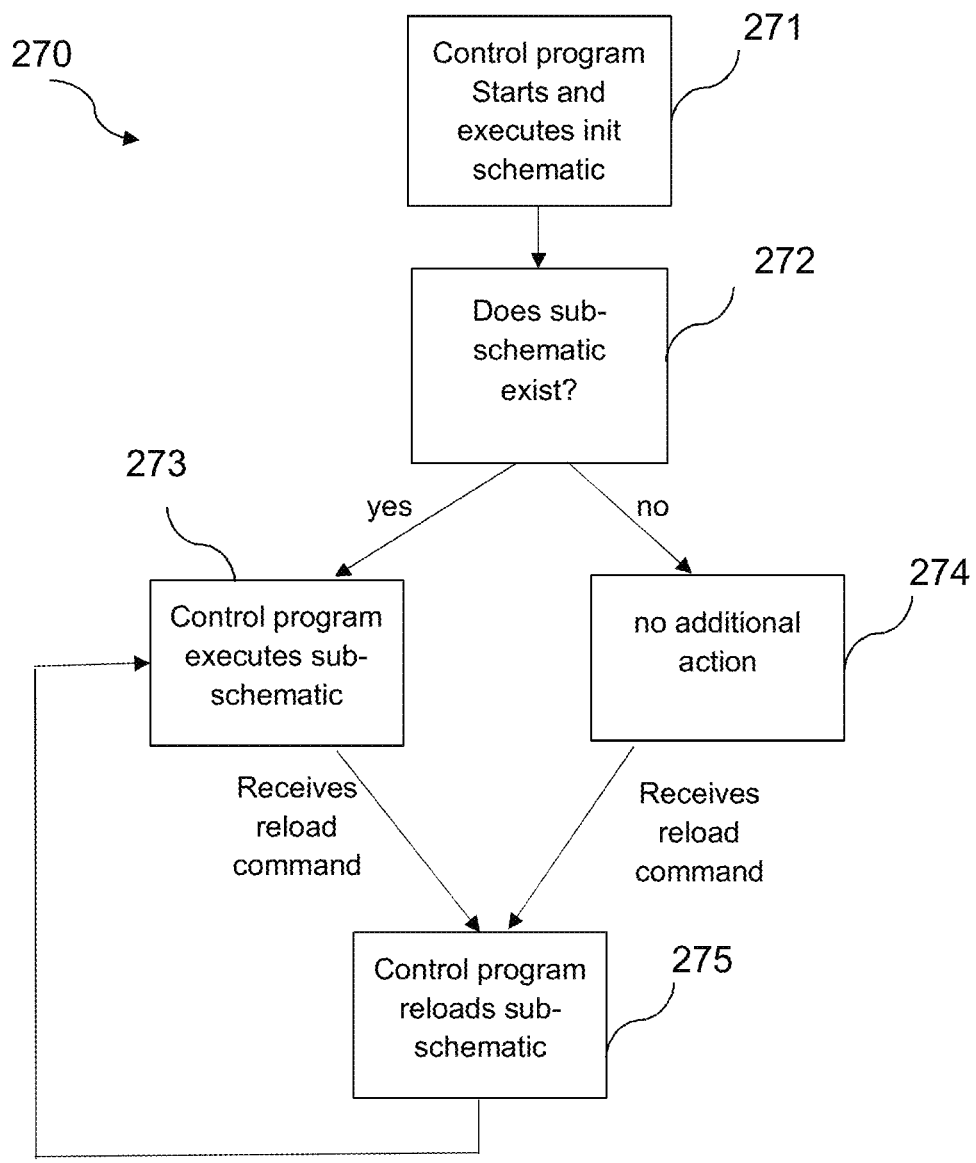
FIG. 27 is a flowchart illustrating a method of executing a control program in a device in accordance with an embodiment of the present invention.

FIG. 27 is a flowchart illustrating a method 270 of executing a control program in a device in accordance with an embodiment of the present invention. A control program is a device-dependent software program that is loaded at a device of a particular type and executes sub-schematics in that device. When the device is powered on, in a first process 271 of the method 270, the control program starts and executes an init schematic that is pre-loaded on the device. In a second process 272, the control program then check if a sub-schematic exists on the device. In an embodiment, if the sub-schematic exists, it is saved as a file on the hard drive of the device. If the control program locates such a sub-schematic, in a third process 273, the control program executes the sub-schematic. If the control program does not locate such a sub-schematic, in a fourth process 274, the control program takes no additional action. The control program then continues execution.

When the control program receives a reload command, in a fifth process 275, the control program reloads a new sub-schematic and executes the reloaded sub-schematic. The control program typically receives the reload command from the update module instance (e.g., update module instance 262 of FIG. 26), but the reload command may be received from other sources internal and external to the device. When a control program executes a sub-schematic, it also loads the device-dependent blocks associated with any primitive module instances in the sub-schematic. The control program is able to select the correct device-dependent block based on the type property associated with each primitive module instance in the sub-schematic.

Figure 28:
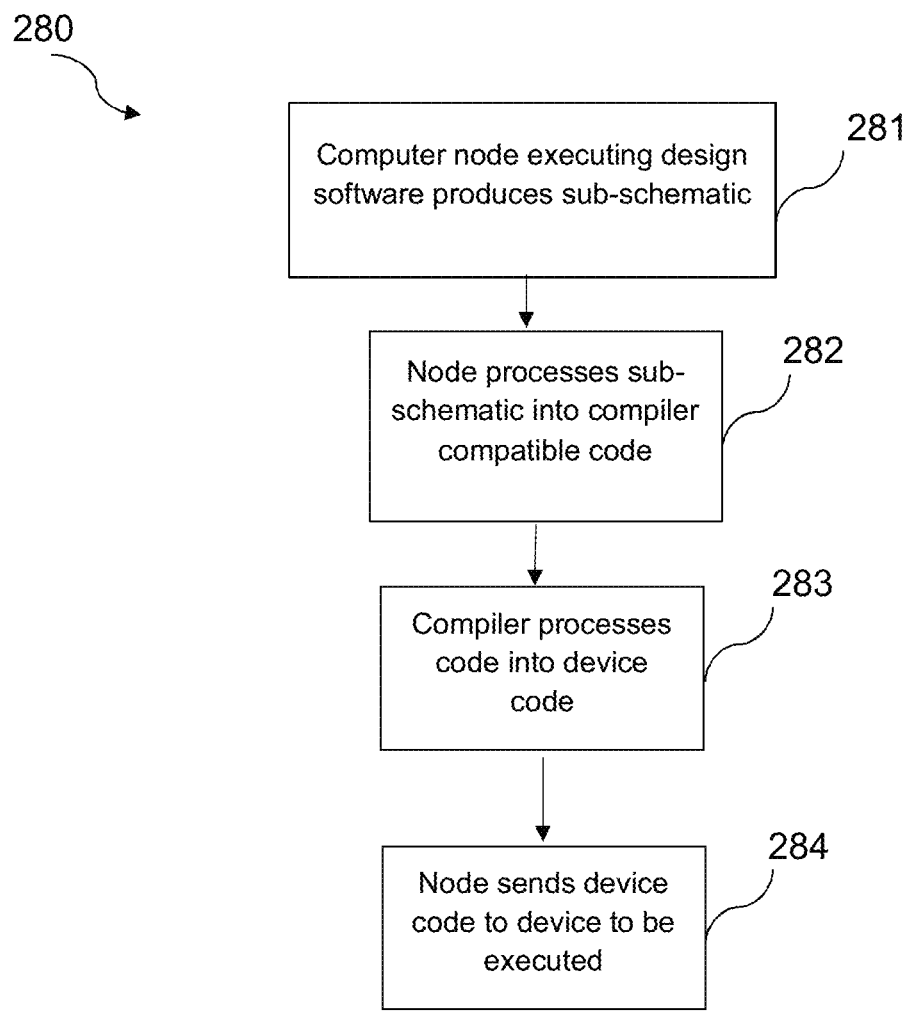
FIG. 28 is a flowchart illustrating a method of providing executable code for a low-capability device in accordance with an embodiment of the present invention.

FIG. 28 is a flowchart illustrating a method 280 of providing executable code for a low-capability device in accordance with an embodiment of the present invention. There are some low-capability devices in a distributed heterogeneous system that do not have the capabilities (e.g., processing capabilities, memory capabilities, etc.) to run a control program for executing a schematic. An example of such low-capability device is a low-power microcontroller configured without an operating system.

For such devices, the design software further processes the sub-schematics into a form executable on these devices without a control program, as shown in method 280 of FIG. 28. In a first process 281 of method 280, a computer node executing the design software produces a sub-schematic for such a device. In a second process 282, the computer node then processes the sub-schematic into compiler-compatible code. In an embodiment, the sub-schematic is processed internally by the design software, and in another embodiment, the sub-schematic is processed through external converter software. In a third process 283, the computer node runs external compiler software to compile the compiler-compatible code into device code, which can be executed in the target low-capability device corresponding to the sub-schematic. In a fourth process 284, the computer node sends the device code to the target device, which is configured with a bootloader that can load and execute the device code.

Figure 29:
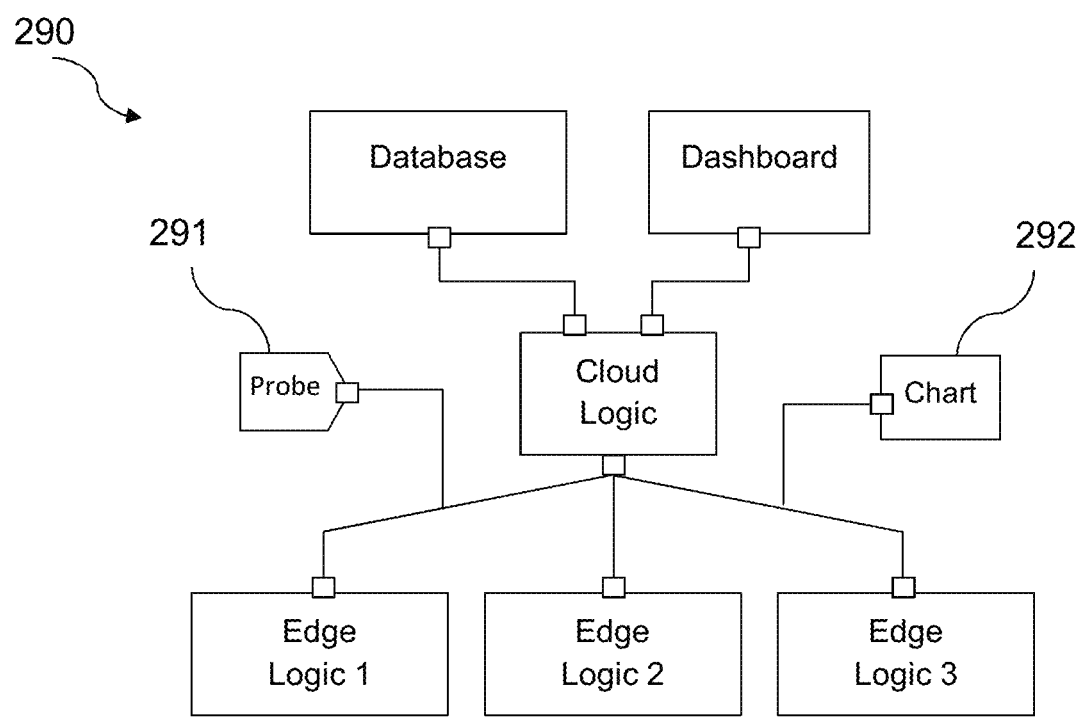
FIG. 29 is a block diagram of a schematic that includes module instances providing visualize data for a distributed heterogeneous system in accordance with an embodiment of the present invention.

FIG. 29 is a block diagram of a schematic that includes module instances providing visualize data for a distributed heterogeneous system in accordance with an embodiment of the present invention. As is known by one of ordinary skill in the art, traditional design software may provide data visualization capabilities for non-distributed systems, where the visualization of data can be performed in a central location. However, data visualization is not as straightforward in distributed heterogeneous systems. In distributed heterogeneous systems, visualization components must be executed in distributed devices, where no such central location exists to visualize data in such systems. The design software of the present invention provides visualization functionality in a manner that collects all visualization components from the distributed devices into the design software for visualization.

In the design software of the present invention, a user, through a graphical user interface associated with the design software, is provided the option to add visualization module instances to pins and virtual wires of module instances in a schematic. FIG. 29 shows the system schematic 290, which is the system schematic 130 of FIG. 13 with the addition of two visualization module instances: a probe module instance 291 and a chart module instance 292. The probe module instance 291 is added coupled to a first virtual wire connecting the "Cloud Logic" module instance and the "Edge Logic 1" module instance. The probe module instance 291 captures and prints data communicated on the first virtual wire. The chart module instance 292 is added coupled to a second virtual wire connecting the "Cloud Logic" module instance and the "Edge Logic 3" module instance. The chart module instance 292 captures and plots data communicated on the second virtual wire. The chart module instance 292 may plot the data in a number of formats user-selectable from a graphical user interface associated with the design software. As the virtual wires that module instances 291 and 292 received data on do not actually exist in the executed sub-schematics on the distributed heterogeneous devices, the probe and chart module instances 291, 292 do not function in the same manner as in traditional design software. The configuration and function of such visualization module instances is further described in FIG. 30.

Figure 30:
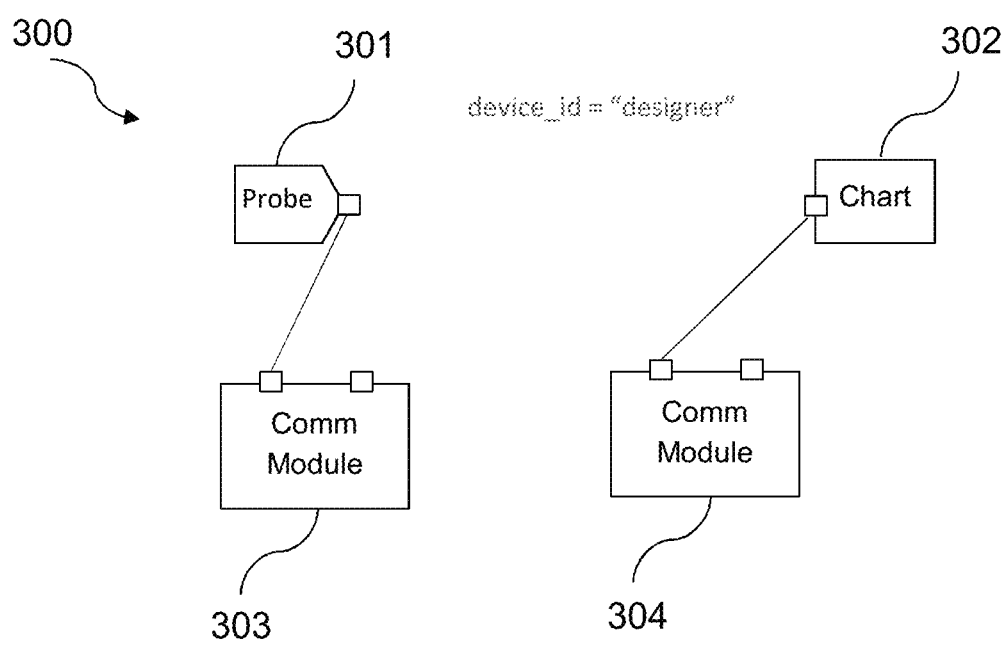
FIG. 30 is a block diagram of a sub-schematic for performing data visualization in accordance with an embodiment of the present invention.

FIG. 30 is a block diagram of a sub-schematic 300 for performing data visualization in accordance with an embodiment of the present invention. In embodiments, the design software of the present invention creates a virtual device with a device_id set to "designer". When a user selects to connect the probe module instance 301 and the chart module instance 302 to virtual wires in a schematic, the design software sets the device property for these module instances 291, 292 to the device_id of "designer". During the parsing process, the design software produces a sub-schematic 300 of FIG. 30 for the designer device, and parses all modules set to this device property into the sub-schematic 300, including the probe module instance 301 and the chart module instance 302. During the parsing process, the design software also adds comm module instances 303, 304, such as described in FIG. 18, to replace the virtual wires to which to the probe and the plot module instances 301, 302 are connected. The design software couples the probe module instance 301 to the added comm module instance 303 and couples the chart module instance to the added comm module instance 304.

In an embodiment, the sub-schematic for the designer device is executed by the design software in a simulation context that enables a user to visualize data inside the design software. In this embodiment, the designer device is called a virtual device because the device executes inside the design software and does not represent a real device in the distributed heterogeneous system. However, there is no restriction in the design software as to the type of device to execute the virtualization capabilities. In another embodiment, the virtual device identifier may be replaced by a real device identifier, and the sub-schematic 300 can be executed in that real device.

Figure 31:
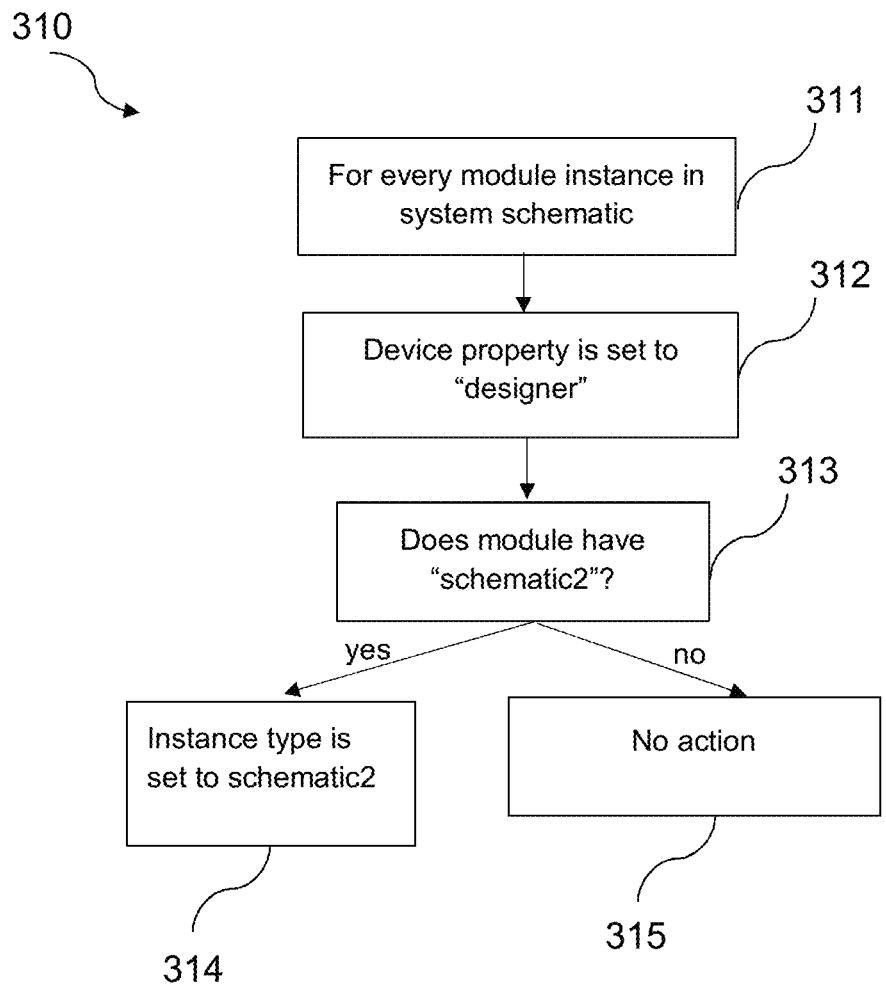
FIG. 31 is a flowchart illustrating a method of updating a schematic for execution in a simulation context through a virtual device in accordance with an embodiment of the present invention.
Figure 1:
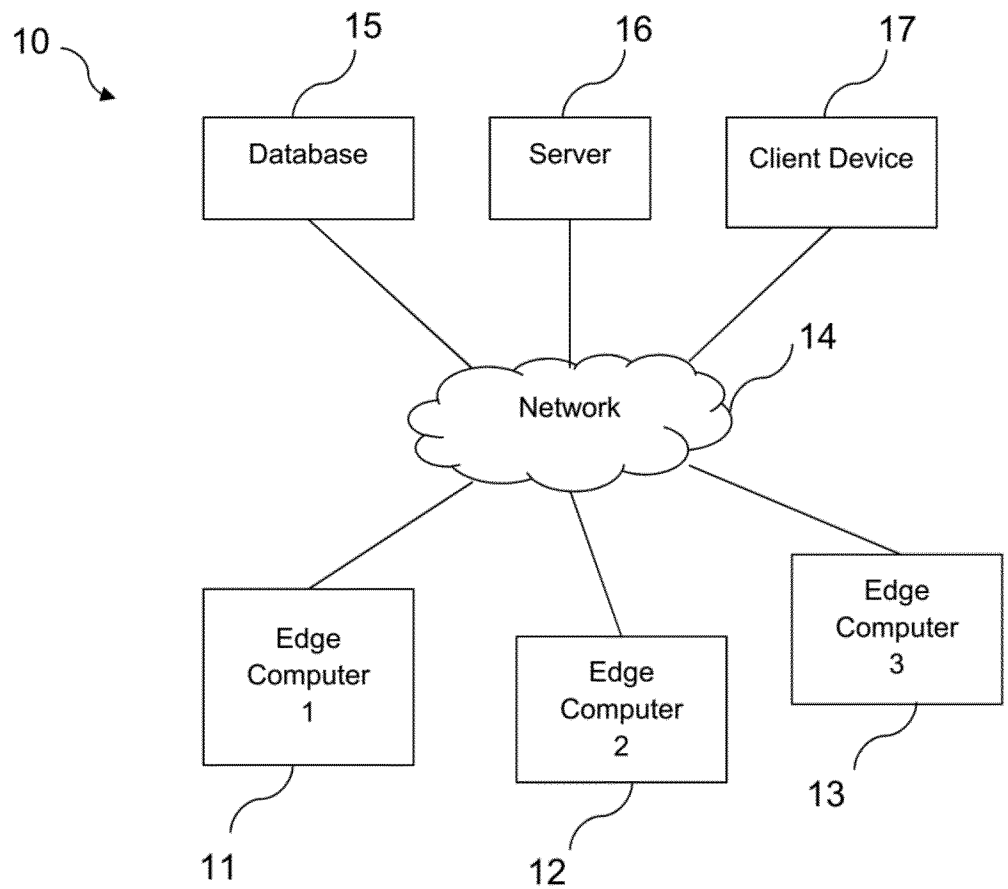
Figure 17:
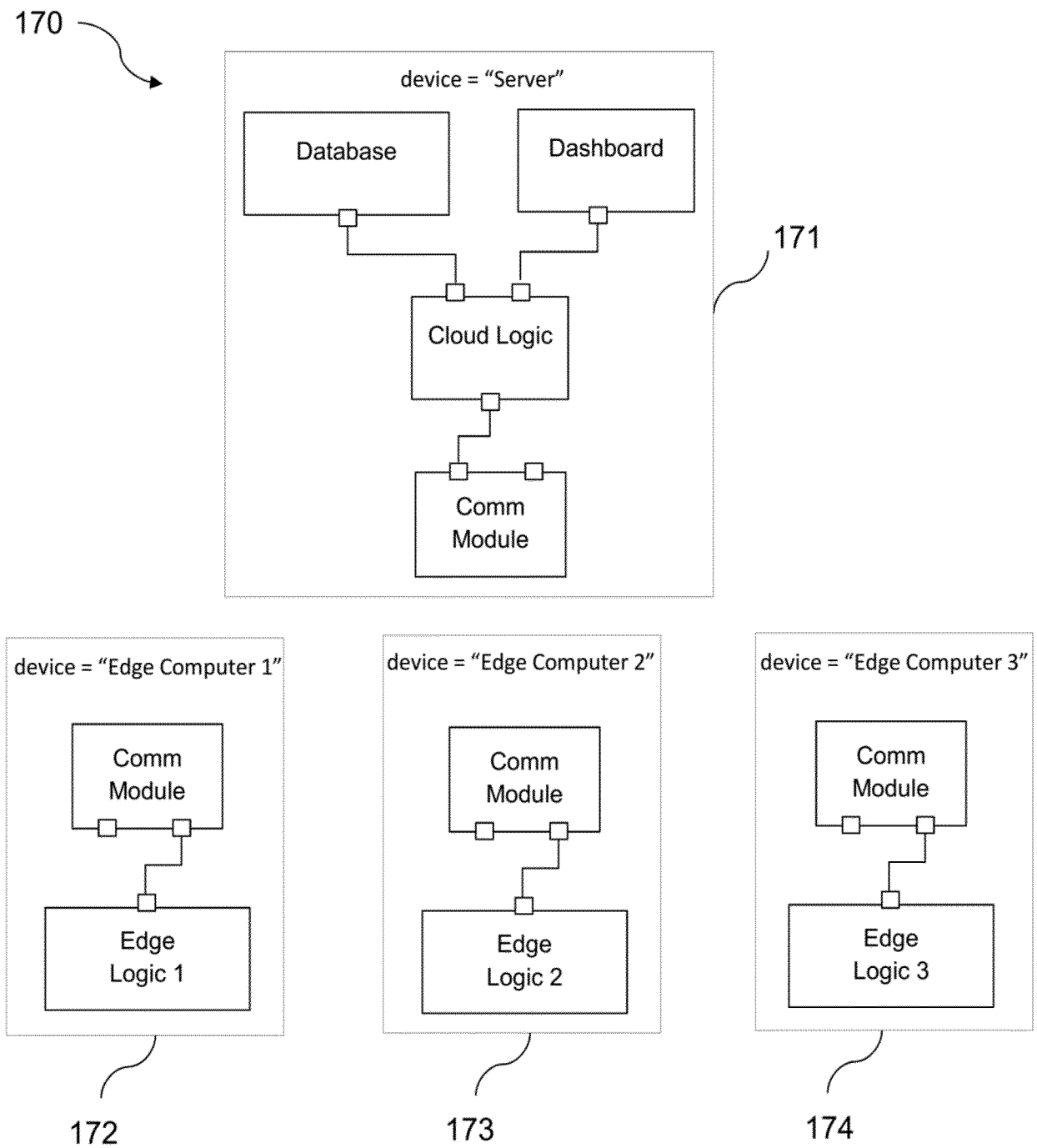

FIG. 31 is a flowchart illustrating a method 310 of updating a schematic for execution in a simulation context through a virtual device in accordance with an embodiment of the present invention. A special type of schematic also exists in embodiments, referred to as a behavioral schematic. A behavioral schematic is typically a model of a functional schematic or a device-dependent block, such as a simplified model or a statistical module. Unlike a functional schematic, a behavioral schematic is used in a simulation context, rather than for execution on a physical device of the distributed heterogeneous system. The simulation context is typically performed in the design software for understanding issues associated with the distributed heterogeneous system, such as statistical variations, corner cases, and special input conditions.

In a first process 311 of method 310, the computer node executing the design software locates each module instance in the system schematic. In a second process 312, the computer node sets the device property of each located module instance to the value of "designer". The designer device is a virtual device that is executed inside the design software in a simulation context. In a third process 313, for each module with an instance in the system schematic, the computer node determines if the module includes a component set to the behavioral schematic named "schematic 2".

In method 310, "schematic 2" is the default name for the behavioral schematic, but in other methods the default name of the behavioral schematic may be any other name without limitation. If "schematic 2" is included in a given module, in a fourth process 314, the design software sets the module instance type for each instance of the given module in the system schematic to "schematic 2". If "schematic 2" is not included in a given module, in a fifth process 315, the design software takes no action on the instances of that module in the system schematic.

When the design software parses the system schematic, only one sub-schematic corresponding to the virtual designer device is produced with each module instance set to "schematic 2" if a "schematic 2" component is available. The one sub-schematic is deployed internal to the design software, and, when the design software executes this sub-schematic, it is run in a simulation context. The method 310 may be implemented in various other embodiments. In an embodiment, the behavioral schematic does not need to be restricted to execute, in the simulation context, inside the design software. In this embodiment, the user, through the graphical user interface associated with the design software, may manually select one or more device types, and the behavioral schematic can execute, in the simulation context, in a device or distributed through multiple devices corresponding to the selected one or more device types. In another embodiment, the user can select behavioral schematics other than "schematic 2", which is useful when multiple behaviors need to be simulated, requiring multiple behavioral schematics.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof.

Computer program logic implementing all or part of the functionality previously described herein may be embodied in various forms, including, but in no way limited to, a source code form, a computer executable form, and various intermediate forms (e.g., forms generated by an assembler, compiler, networker, or locator.) Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies, networking technologies, and internetworking technologies. The computer program may be distributed in any form as a removable storage medium with accompanying printed or electronic documentation (e.g., shrink wrapped software or a magnetic tape), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

While the invention has been particularly shown and described with reference to specific embodiments, it will be understood by those skilled in the art that various changes in form and detail may be made therein without departing from the spirit and scope of the invention as defined by the appended clauses. While some of these embodiments have been described in the claims by process steps, an apparatus comprising a computer with associated display capable of executing the process steps in the claims below is also included in the present invention. Likewise, a computer program product including computer executable instructions for executing the process steps in the claims below and stored on a computer readable medium is included within the present invention.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A computer-implemented method of (i) designing an application for a distributed heterogeneous computing and control system, the distributed system having a plurality of device nodes in physically distinct locations, in communication with one another over a network, wherein one or more device nodes in the system require different application programming code due to differences in hardware configuration or software configuration, the computing and control system having a hardware context and (ii) configuring the application in the hardware context, the method implemented by design software instructions executing in a design computer, associated with an interactive display, to establish an interactive environment, with a graphical user interface, utilizing computer processes comprising:

providing, by the design computer, access in the interactive environment to a set of modules, each module containing one or more of the following components: property table, symbol, functional schematics, behavioral schematics, and device-dependent blocks, wherein any of the modules can be graphically selected by a user;

associating, by the design computer, each of the device nodes with a unique identifier;

receiving, by the design computer, in the interactive environment, a selection of desired ones of the modules and ordering them in a manner to characterize the application as a system schematic of a complete set of the device nodes in the distributed computing and control system, the system schematic being hierarchical and including all elements in all hierarchies;

parsing, by the design computer, the system schematic to produce a set of sub-schematics of the application, each sub-schematic being a part of the application, wherein each sub-schematic corresponds to a distinct device node in the set of device nodes in the distributed computing and control system;

transmitting, to each device node, by the design computer, the corresponding sub-schematic, such sub-schematic being in netlist format, so as to provide a text representation of the sub-schematic, and so as to characterize each of the device nodes in accordance with the system schematic; and configuring, by the design computer, each device node to execute the netlist format of the sub-schematic via a corresponding control program running inside the device node.

2. A computer-implemented method according to claim 1, wherein the design computer is a stand-alone computer.

3. A computer-implemented method according to claim 1, wherein the design computer is implemented by a client-server combination in a network environment.

4. A computer-implemented method according to claim 1, wherein the computer processes further comprise:

rendering, by the design computer, a view of the schematic in the interactive environment by retrieving and processing a stored netlist.

5. A computer-implemented method according to claim 1, wherein the interactive environment includes graphical components of a design canvas, a library manager, and a menu, wherein any of the graphical components can be graphically selected by the user.

6. A computer-implemented method according to claim 5, wherein the computer processes further comprise:

displaying, by the design computer, in the design canvas a member selected from the group consisting of the schematic, a corresponding netlist, and combinations thereof.

7. A computer-implemented method according to claim 1, wherein the computer processes further comprise:

assigning, by the design computer, a device name to at least one device node in the set of device nodes, wherein the device name can be graphically inscribed by the user.

8. A computer-implemented method according to claim 1, wherein receiving the selection of the desired ones of the modules causes creation of module instances corresponding to the desired ones, and ordering the module instances in a manner to characterize the distributed computing and control system as the system schematic, wherein the modules include functional modules and primitive modules.

9. A computer-implemented method according to claim 8, wherein ordering the module instances includes, with respect to a pair of the module instances that are to be in communication with one another, configuring a virtual wire between the pair to indicate such communication.

10. A computer-implemented method according to claim 1, wherein the computer processes further comprise:

following receiving, by the design computer, an input of dragging and dropping a graphical representation of a given module to a view of the system schematic displayed in a design canvas of the interactive environment, causing a module instance of the given module to be created and ordered in the system schematic.

11. A computer-implemented method according to claim 1, wherein the computer processes further comprise:

characterizing, by the design computer, a module instance of a given module using graphically selectable components selected from the group consisting of (i) at least one property in a property table, (ii) a graphical representation, (iii) at least one schematic, (iv) at least one device-dependent block, and (iv) combinations thereof.

12. A computer-implemented method according to claim 11, wherein the property table contains properties for characterizing the at least one schematic that include type and version.

13. A computer-implemented method according to claim 11, wherein, when the given module is a primitive module, the property table contains properties for each device-dependent block associated with the given module, wherein the properties for each device-dependent block include a device type list and version.

14. A computer-implemented method according to claim 11, wherein the property table contains user-selectable properties for the module instance selected from the group consisting of (i) an instance name, (ii) an instance type for instantiating the given module, (iii) a particular device node in which to execute the module instance, (iv) at least one instance parameter, and (v) combinations thereof.

15. A computer-implemented method according to claim 14, wherein at least one property of the particular device node is inherited by each child module instance created from the module instance.

16. A computer-implemented method according to claim 1, wherein the computer processes further comprise:

associating, by the design computer, a device-dependent block with a module instance of a given primitive module, including:

locating, in a property table for the module instance, a device property corresponding to the module instance, wherein the device property specifies a device identifier (ID) for one of the set of device nodes;

mapping the device ID to a device type, and locating, in the property table for the given module, the device-dependent block associated with the device type; and automatically updating, in the property table for the module instance, a type property corresponding to the module instance with a name assigned to the device-dependent block.

17. A computer-implemented method according to claim 16, wherein automatically updating the type property is overridden by user-selection of the type property.

18. A computer-implemented method according to claim 1, wherein the computer processes further comprise:

displaying, by the design computer, in the interactive environment:

a tree graph that includes a hierarchical structure of module instances characterizing the system schematic; and graphical representations of correctly-chosen device-dependent blocks positioned below the tree graph and linked to corresponding primitive module instances in the tree graph.

19. A computer-implemented method according to claim 1, wherein transmitting the set of sub-schematics to the set of device nodes includes, for each sub-schematic that has a primitive module instance, transmitting a device-dependent block to a distinct device node corresponding to the sub-schematic.

20. A computer-implemented method according to claim 1, wherein the system schematic has components, including module instances, and the computer processes further comprise:
assigning, by the design computer, to a given component of the system schematic, a distinct address based on a combination of (i) a device ID of a device node, (ii) a path that defines a name of each component to be traversed in order within the system schematic to reach the given component, and (iii) a name of the given component.

21. A computer-implemented method according to claim 1, wherein the system schematic has components, including module instances, and the computer processes further comprise:
assigning, by the design computer, to a given module instance, a distinct address based on a combination of (i) a device ID of a device node, and (ii) an ID of the given module instance; and
assigning, by the design computer, to a given component which is not a module instance, a unique address that is defined by the combination of: (i) a device ID of a device node, (ii) an ID of a module instance that includes the given component, and (iii) a name of the given component.

22. A computer-implemented method according to claim 1, wherein parsing the system schematic includes:
for each device node in the set of device nodes, creating a sub-schematic for the device node;
for each module instance of the system schematic, copy the module instance into a sub-schematic in which the device node of the sub-schematic corresponds to a device ID of the module instance;
processing a virtual wire that connects a first module instance and a second module instance in the system schematic, including:
when the first module instance and the second module instance are both in a given sub-schematic, preserving the virtual wire in the given sub-schematic; and
when the virtual wire connects (i) an output pin of the first module instance in a first sub-schematic to (ii) an input pin of the second module instance in a second sub-schematic, creating a communication connection between the first sub-schematic and the second sub-schematic.

23. A computer-implemented method according to claim 22, wherein creating the communication connection includes:
adding a first communication module instance to the first sub-schematic, and adding a virtual wire between the output pin of the first module instance and an input pin of the first communication module instance;
adding a second communication module instance to the second sub-schematic, and adding a virtual wire between an output pin of the second communication module instance and the input pin of the second module instance;
setting a destination address included in the first communication module instance to an address of the input pin of the second module instance; and
setting a receive address included in the second communication module to an address of the input pin of the second module instance.

24. A computer-implemented method according to claim 23, wherein the computer processes further comprise:
assigning, by the design computer, to each of the destination address and receive address, a distinct address based on a combination of (i) a device ID of a device node, (ii) a path that defines a name of each component to be traversed in order within the system schematic to reach a targeted pin, and (iii) a name of the targeted pin.

25. A computer-implemented method according to claim 23, wherein the computer processes further comprise:
assigning, by the design computer, to each of the destination address and receive address, a distinct address based on a combination of (i) a device ID of a device node, (ii) an ID of a module instance that includes a targeted pin, and (iii) a name of the targeted pin.

26. A computer-implemented method according to claim 23, wherein the communication module is associated with a plurality of functional schematics, wherein each functional schematic implements a distinct communication protocol, and wherein the interactive environment is configured for both (i) user-selection that individually changes a communication module instance type for a given communication module instance, and (ii) user-selection that globally changes the communication module instance type for each communication module instance.

27. A computer-implemented method according to claim 1, wherein the computer processes further comprise:
establishing, by the design computer, a central communication broker that utilizes a publish-subscribe communication protocol for communications between a first communication module instance and a second communication module instance, wherein the publish-subscribe communication protocol is configured to:
receive a request to subscribe a second communication module instance with the central communication broker, wherein the request includes specifying a receive address of the second communication module instance, and the receive address is an address of an input pin of a module instance connected to the second communication module;
transmit a data packet from a first communication module instance to the central communication broker, wherein the data packet contains data selected from the group consisting of a data payload, a destination address, a source address, and combinations thereof, and wherein the source address is an address of an output pin of a module instance connected to the first communication module instance, and the destination address is an address of the input pin of the intended destination module instance; and
when the destination address in the data packet matches the receive address of the second communication module instance, cause the communication broker to forward the data packet to the second communication module instance.

28. A computer-implemented method according to claim 1, wherein the sub-schematic is configured such that a communication module instance, which includes a transmit path and a receive path, is shared among a plurality of module instances of the sub-schematic, and the computer processes further comprise:
transmitting, by the design computer, to a communication module instance in a device node of the set of device nodes, a given data packet with a destination address that includes identification of the device node, and wherein the communication module instance is configured to:

receive, through the receive path, any data packet that has a destination address that includes identification of the device node, including the given data packet; and analyze the destination address in the given data packet, and forward the given data packet to a module instance of the sub-schematic with a receive address corresponding to the destination address.

29. A computer-implemented method according to claim 1, wherein the computer processes further comprise:

causing, by the design computer, a device node of the set of device nodes to execute a new schematic loaded on the device node, wherein the device node is pre-loaded with a control program and an init schematic having a communication module instance connected to a system module instance, wherein a receive address of the communication module instance is set to receive any data packet in which a destination address includes identification of the device node and the system module, including:

transmitting, by the design computer, to the device node a data packet that has a data payload containing a new sub-schematic and the destination address that includes identification of the device node and the system module, wherein the destination address causes the system module instance to (i) receive the data packet, (ii) load on the device node the new sub-schematic, and (iii) request the control program to execute the new sub-schematic.

30. A computer-implemented method according to claim 1, wherein the computer processes further comprise:

causing, by the design computer, a device node to execute schematics, and wherein the device node is configured to:

pre-load a control program and an init schematic;

when the device node is powered on, cause execution of the init schematic by the control program;

receive and load, using the init schematic, a new sub-schematic; and receive a reload command that causes execution of the new sub-schematic by the control program.

31. A computer-implemented method according to claim 30, wherein, for each primitive module instance in a sub-schematic, executing in the device node, a device-dependent block associated with the primitive module instance, wherein the device-dependent block is loaded by the control program using a type module instance property of the associated primitive module instance.

32. A computer-implemented method according to claim 1, wherein the computer processes further comprise:

executing, by the design computer, a compiler that converts a sub-schematic into binary code; and transmitting, by the design computer, to a low-capability device node corresponding to the system schematic, the binary code for execution on the low-capability device node.

33. A computer-implemented method according to claim 1, wherein the computer processes further comprise:

receiving, by the design computer, in the interactive environment selection of a visualization module instance to further characterize the application as the system schematic;

setting, by the design computer, a device property of the visualization module instance in the system schematic to a value indicating a simulation context;

parsing, by the design computer, the system schematic to produce the set of sub-schematics includes producing a sub-schematic for a virtual device; and executing, by the design computer, the sub-schematic in the simulation context through the virtual device.

34. A computer-implemented method according to claim 33, wherein the device property of the visualization module instance is set to an ID of at least one device node, and the computer processes further comprise causing the visualization module to be transmitted to the at least one device node for execution.

35. A computer-implemented method according to claim 1, wherein the computer process further comprise:

receiving, by the design computer, in the interactive environment selection of simulate menu option;

for each module instance in the system schematic:

setting, by the design computer, a device property of the module instance to a value indicating execution of the module instance in a simulation context, and when a default behavioral schematic is associated with the module instance, setting a type property of the module instance to a component name indicating a default behavioral schematic;

parsing the system schematic to produce only one sub-schematic for a virtual device; and executing, by the design computer, each module instance of the sub-schematic in the simulation context through the virtual device.

36. A computer-implemented method according to claim 35, wherein the type property of a module instance is user-selectable to a different value than the component name of the default behavioral schematic.

* * * * *

UNITED STATES PATENT AND TRADEMARK OFFICE
CERTIFICATE OF CORRECTION

Page 1 of 3

PATENT NO. : 10,685,155 B2
APPLICATION NO. : 16/431966
DATED : June 16, 2020
INVENTOR(S) : Andrew Wang It is certified that error appears in the above-identified patent and that said Letters Patent is hereby corrected as shown below:

In the Drawings

Please replace the current Figure 1 with the attached Figure 1 and replace the current Figure 17 with the attached Figure 17.

Signed and Sealed this
First Day of September, 2020

Andrei Iancu
*Director of the United States Patent and Trademark Office*